(12) United States Patent
Hayashi et al.

(10) Patent No.: US 10,326,947 B2
(45) Date of Patent: Jun. 18, 2019

(54) IMAGE PROCESSING DEVICE, IMAGING DEVICE, IMAGE PROCESSING METHOD, AND PROGRAM

(71) Applicant: FUJIFILM Corporation, Tokyo (JP)

(72) Inventors: Kenkichi Hayashi, Saitama (JP); Junichi Tanaka, Saitama (JP); Yousuke Naruse, Saitama (JP); Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 55 days.

(21) Appl. No.: 15/789,146

(22) Filed: Oct. 20, 2017

(65) Prior Publication Data

US 2018/0041714 A1 Feb. 8, 2018

Related U.S. Application Data

(63) Continuation of application No. PCT/JP2016/062173, filed on Apr. 15, 2016.

(30) Foreign Application Priority Data

Apr. 23, 2015 (JP) ................................. 2015-088232

(51) Int. Cl.
*H04N 5/243* (2006.01)
*G06T 5/00* (2006.01)
(Continued)

(52) U.S. Cl.
CPC .............. *H04N 5/243* (2013.01); *G06T 5/00* (2013.01); *G06T 5/001* (2013.01); *G06T 5/20* (2013.01);
(Continued)

(58) Field of Classification Search
CPC ...... H04N 5/243; H04N 5/232; H04N 5/2351; H04N 5/332; H04N 1/409; H04N 1/4093; H04N 1/4097
(Continued)

(56) References Cited

U.S. PATENT DOCUMENTS

2011/0135216 A1 6/2011 Hatakeyama
2015/0207962 A1 7/2015 Sugimoto et al.
(Continued)

FOREIGN PATENT DOCUMENTS

JP 2008-113704 A 5/2008
JP 2011-123589 A 6/2011
(Continued)

OTHER PUBLICATIONS

International Preliminary Report on Patentability and Written Opinion of the International Searching Authority (forms PCT/IB/373, PCT/ISA/237 and PCT/IB/326), dated Nov. 2, 2017, for International Application No. PCT/JP2016/062173, with an English translation of the Written Opinion.
(Continued)

*Primary Examiner* — Nguyen T Truong
(74) *Attorney, Agent, or Firm* — Birch, Stewart, Kolasch & Birch, LLP

(57) ABSTRACT

The present invention provides an image processing device, an imaging device, an image processing method, and a program which are capable of accurately correcting blurring caused in first image data of an image using a near-infrared ray as a light source and, accurately performing a point image restoration process on second image data of an image using visible light and a near-infrared ray as a light source. An image processing device according to an aspect of the present invention includes an image input unit, a determination unit that determines whether image data is first image
(Continued)

data or second image data, a first restoration processing unit that performs a first restoration process using first restoration filters for performing phase correction and amplitude restoration on the determined first image data, and a second restoration processing unit that performs a second restoration process using second restoration filters for performing amplitude restoration without phase correction on the determined second image data.

13 Claims, 20 Drawing Sheets

(51) Int. Cl.
    *H04N 1/409*     (2006.01)
    *H04N 5/232*     (2006.01)
    *G06T 5/20*     (2006.01)
    *H04N 5/235*     (2006.01)
    *H04N 5/33*     (2006.01)
    *H04N 9/73*     (2006.01)
    *H04N 9/68*     (2006.01)
    *H04N 9/04*     (2006.01)
    *H04N 9/077*     (2006.01)

(52) U.S. Cl.
    CPC ........... *H04N 1/409* (2013.01); *H04N 1/4092* (2013.01); *H04N 1/4097* (2013.01); *H04N 5/232* (2013.01); *H04N 5/2351* (2013.01); *H04N 5/332* (2013.01); *H04N 9/68* (2013.01); *H04N 9/735* (2013.01); *G06T 2207/10024* (2013.01); *G06T 2207/10048* (2013.01); *G06T 2207/30232* (2013.01); *H04N 9/045* (2013.01); *H04N 9/077* (2013.01); *H04N 2209/047* (2013.01)

(58) Field of Classification Search
    USPC ......................................................... 348/164
    See application file for complete search history.

(56) References Cited

U.S. PATENT DOCUMENTS

2015/0379695 A1    12/2015    Naruse et al.
2016/0027157 A1    1/2016    Naruse et al.

FOREIGN PATENT DOCUMENTS

WO    WO 2014/136322 A1    9/2014
WO    WO 2014/148074 A1    9/2014
WO    WO 2014/155755 A1    10/2014

OTHER PUBLICATIONS

International Search Report (form PCT/ISA/210), dated Jun. 14, 2016, for International Application No. PCT/JP2016/062173, with an English translation.

Japanese Decision to Grant a Patent, dated Nov. 7, 2017, for Japanese Application No. 2017-514103, with an English translation.

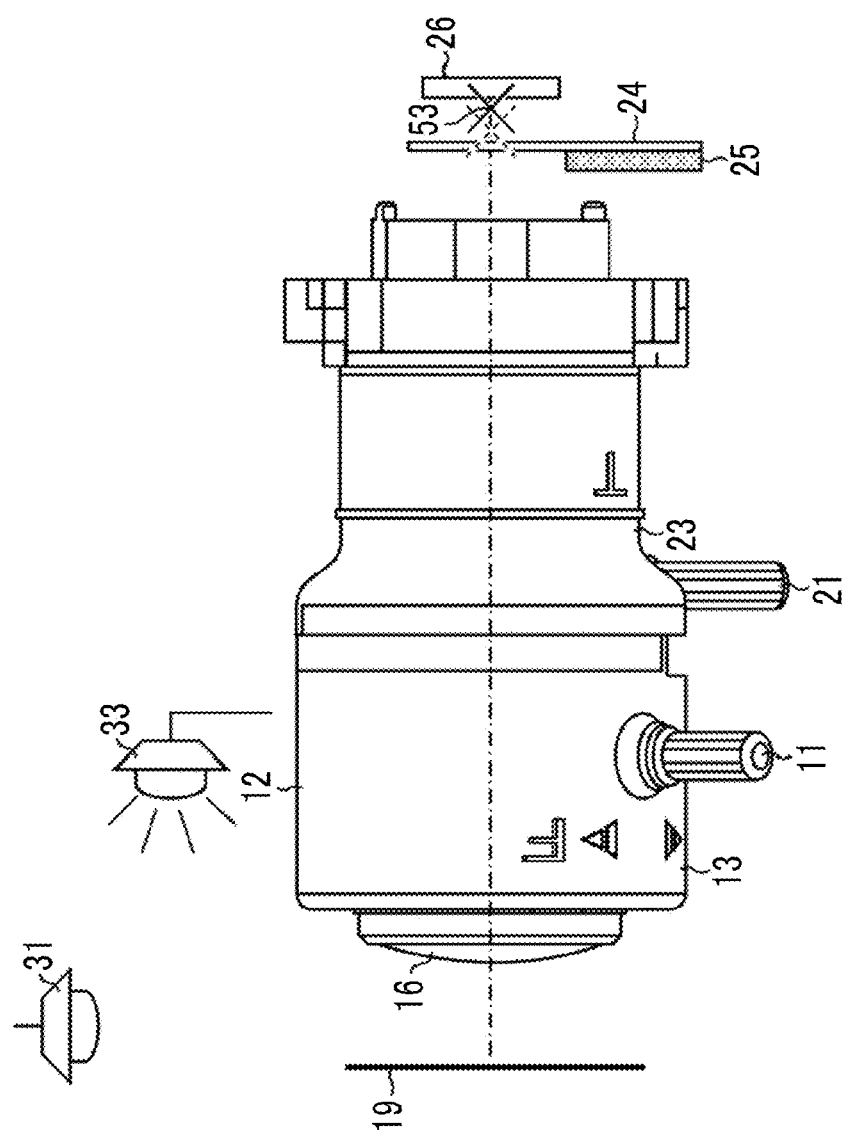

IMAGE PROCESSING DEVICE, IMAGING DEVICE, IMAGE PROCESSING METHOD, AND PROGRAM

CROSS-REFERENCE TO RELATED APPLICATIONS

The present application is a Continuation of PCT International Application No. PCT/JP2016/062173 filed on Apr. 15, 2016 claiming priority under 35 U.S.C § 119(a) to Japanese Patent Application No. 2015-088232 filed on Apr. 23, 2015. Each of the above applications is hereby expressly incorporated by reference, in their entirety, into the present application.

BACKGROUND OF THE INVENTION

1. Field of the Invention

The present invention relates to an image processing device, an imaging device, an image processing method, and a program, and particularly, to an image processing device, an imaging device, an image processing method, and a program which perform image processing on an image using visible light or a near-infrared ray as a light source based on a point spread function.

2. Description of the Related Art

A point spread phenomenon in which a point subject is slightly spread may be seen in a subject image imaged through an optical system due to an influence such as diffraction and aberration caused by the optical system. A function representing a response to a point light source of the optical system is called a point spread function (PSF), and is known as characteristics that determine resolution deterioration (blurring) of an imaged image.

A point image restoration process (restoration process) is performed on the imaged image of which the image quality is deteriorated due to the point spread phenomenon based on the PSF, and thus, it is possible to recover the image quality thereof. The point image restoration process is a process of previously acquiring deterioration characteristics (point image characteristics) caused by an aberration of a lens (optical system) and canceling or reducing the point spread of the imaged image through image processing using a restoration filter (recovery filter) corresponding to the point image characteristics.

The point image restoration process may be greatly divided into an amplitude restoration process and a phase correction process. The amplitude restoration process is a process of equalizing, that is, recovering modulation transfer function (MTF) characteristics deteriorated by the optical system, and the phase correction process is a process of equalizing, that is, recovering phase transfer function (PTF) characteristics deteriorated by the optical system.

Intuitively, the phase correction process is a process of moving an image depending on a frequency such that a point-asymmetric PSF shape is returned to a point-symmetric shape if possible.

The amplitude restoration process and the phase correction process may be simultaneously applied as signal processing, but it is possible to perform only one of these processes by correcting a method of designing a filter coefficient.

For example, WO2014/148074A discloses a technology that performs a point image restoration process of performing an amplitude restoration process and a phase correction process and a point image restoration process of performing an amplitude restoration process without phase correction.

For example, JP2008-113704A discloses a technology that performs a point image restoration process (convolution arithmetic) on an image acquired by irradiating a subject with visible light or a near-infrared ray by changing arithmetic coefficients in the visible light and the near-infrared ray.

There is a surveillance camera as a camera that is provided in a fixed point and performs imaging regardless of the day or night. In the camera such as the surveillance camera, it is necessary to acquire appropriate images in imaging conditions of the daytime, twilight, dawn, and nighttime. For example, in a case where the surveillance camera acquires an image using a near-infrared ray and visible light as a light source in the twilight and acquires an image using only a near-infrared ray as a light source in the nighttime, the surveillance camera needs to perform image processing appropriate for the image using the near-infrared ray and the visible light as the light source and perform image processing appropriate for the image using only the near-infrared ray as the light source.

SUMMARY OF THE INVENTION

In this case, both the amplitude restoration process and the phase correction process of the point image restoration process are performed on image data of a blurred image by using appropriate restoration filters, and thus, the blurring is accurately corrected. For example, both the amplitude restoration process and the phase correction process in the point image restoration process are performed on the image acquired by imaging the near-infrared ray image of the subject by using the restoration filters (near-infrared ray restoration filters) generated based on the PSF acquired from the near-infrared ray that passes through the optical system, and thus, the blurring is clearly corrected.

In a case where the restoration filters are not appropriate, an intense process of performing both the amplitude restoration process and the phase correction process in the point image restoration process is performed, and thus, there is a concern that the point image restoration process will not be performed normally and an unnatural image will be acquired.

The PSF in a case where the subject is imaged with mixed light of the visible light and the near-infrared ray is different from the PSF in a case where the subject is imaged with the visible light and in a case where the subject is imaged with the near-infrared ray. By doing this, the restoration filters (visible light restoration filters) generated based on the PSF for the visible light of the optical system or the near-infrared ray restoration filters generated based on the PSF for the infrared ray of the optical system are not appropriate for the image imaged with the mixed light of the visible light and the near-infrared ray in performing the intense process of performing both the amplitude restoration process and the phase correction process in the point image restoration process.

Even in a case where the restoration filters generated based on both the PSF for the visible light of the optical system and the PSF for the infrared ray are used, a case where a PSF which is a basis of prepared restoration filters and an actual PSF are different may easily occur in a state in which a mixing condition of the visible light and the near-infrared ray is hourly changed as in a time zone of the twilight or dawn. Thus, the restoration filters may not be appropriate in performing the intense process of performing both the amplitude restoration process and the phase correction process in the point image restoration process.

Thus, in a case where the intense point image restoration process of performing both the amplitude restoration and the phase correction is performed on the image data of the image using the visible light and the near-infrared ray as the light source by using the visible light restoration filters or the near-infrared ray restoration filters, there is a concern that the point image restoration process will not be normally performed and the unnatural image will be acquired.

Accordingly, it is necessary to switch the contents (both the amplitude restoration and the phase correction are performed or any one thereof is performed) of the point image restoration process by using the light source of the acquired (or input) image.

However, in the technology described in WO2014/148074A, the point image restoration process of performing the amplitude restoration process and the phase correction process and the amplitude restoration process without the phase correction are not switched depending on the light source of the acquired image.

In the technology described in JP2008-113704A, the point image restoration process is merely performed by changing the arithmetic coefficient on the visible light image and the near-infrared ray image, and the content of the point image restoration process is not switched depending on the light source of the acquired image.

The present invention has been made in view of such circumstances, and it is an object of the present invention to provide an image processing device, an imaging device, an image processing method, and a program which are capable of more accurately correcting blurring caused in first image data of an image using a near-infrared ray as a light source and accurately performing a point image restoration process on second image data of an image using visible light and a near-infrared ray as a light source.

An image processing device which is an aspect of the present invention comprises: an image input unit that receives image data imaged with sensitivity to a visible light wavelength band and a near-infrared ray wavelength band by using an optical system; a determination unit that determines whether the image data is first image data using a near-infrared ray as a light source or second image data using a near-infrared ray and visible light as a light source; a first restoration processing unit that performs a first restoration process using first restoration filters for performing phase correction and amplitude restoration on the first image data determined by the determination unit, the first restoration filters being based on a first point spread function for a near-infrared ray of the optical system; and a second restoration processing unit that performs a second restoration process using second restoration filters for performing amplitude restoration without phase correction on the second image data determined by the determination unit, the second restoration filters being based on a second point spread function for visible light and a near-infrared ray of the optical system.

According to the present aspect, the first restoration process of performing the phase correction and the amplitude restoration is performed on the first image data using the near-infrared ray as the light source, and the second restoration process of performing the amplitude restoration without the phase correction is performed on the second image data using the near-infrared ray and the visible light as the light source. Accordingly, in the present aspect, it is possible to more accurately correct blurring caused in first image data of an image using a near-infrared ray as a light source and accurately perform a point image restoration process on second image data of an image using visible light and a near-infrared ray as a light source.

Preferably, the image processing device further comprises: a light amount detection unit that detects a light amount of the image data. The determination unit determines whether the image data is the first image data or the second image data based on the light amount detected by the light amount detection unit.

In the present aspect, the first image data using the near-infrared ray as the light source and the second image data using the near-infrared ray and the visible light as the light source are determined based on the light amount detected by the light amount detection unit. Accordingly, in the present aspect, it is possible to accurately determine the first image data and the second image data, and it is possible to perform the point image restoration process appropriate for each of the first image data and the second image data.

Preferably, the determination unit determines whether the image data is the first image data or the second image data based on a time when the image data is acquired.

According to the present aspect, whether the image data is the first image data using the near-infrared ray as the light source or the second image data using the near-infrared ray and the visible light as the light source is determined based on the time when the image data is acquired. Accordingly, in the present aspect, it is possible to accurately determine the first image data and the second image data, and it is possible to perform the point image restoration process appropriate for each of the first image data and the second image data.

Preferably, the image processing device further comprises: a tone correction processing unit that performs non-linear tone correction on the first image data. The tone correction processing unit performs the non-linear tone correction on the first image data on which the phase correction is performed, and the first restoration processing unit performs the amplitude restoration on the first image data on which the non-linear tone correction is performed.

According to the present aspect, the non-linear tone correction is performed on the first image data on which the phase correction is performed, and the amplitude restoration is performed on the first image data on which the non-linear tone correction is performed. Accordingly, in the present aspect, since the phase correction is performed before the tone correction (before the frequency characteristics of the image are changed), it is possible to effectively perform the phase correction. Further, since the amplitude restoration is performed after the tone correction, it is possible to prevent an artifact from being greatly caused without amplifying (emphasizing) overshoot or undershoot slightly caused due to the amplitude restoration through the tone correction.

Preferably, the image processing device further comprises: a tone correction processing unit that performs non-linear tone correction on the first image data. The tone correction processing unit performs the non-linear tone correction on the first image data on which the amplitude restoration is performed, and the first restoration processing unit performs the phase correction on the first image data on which the non-linear tone correction is performed.

In the present aspect, of the amplitude restoration and the phase correction, the amplitude restoration is performed before the tone correction, and the phase correction is performed after the tone correction. Accordingly, in the present aspect, the phase correction filter spreads greatly spatially, and thus, a phenomenon in which an artifact (ringing) is caused around a saturated pixel easily occurs in the phase correction process. However, it is possible to prevent the artifact from being amplified due to the tone correction (the artifact from being greatly caused) by performing the phase correction after the tone correction. Similarly, in the present aspect, a phenomenon in which color gradation is changed due to the phase correction may occur but it is possible to alleviate the phenomenon. Accurately, the phenomenon in which the color gradation is changed also occurs due to the phase correction after the tone correction, but it is possible to further reduce the number of times of the phenomenon occurrence than in a case where the phase correction is performed before the tone correction. In the present aspect, since the number of bits of the image data acquired after the tone correction is less than that of the image data acquired before the tone correction, it is possible to reduce the calculation cost in a case where the phase correction using the phase correction filter of which the number of taps is relatively great is performed.

Preferably, the image processing device further comprises: at least one of a common restoration process arithmetic unit that is used in a restoration process arithmetic of the first restoration processing unit and the second restoration processing unit, a common tone correction arithmetic unit that performs non-linear tone correction on the first image data and the second image data, or a common contour emphasis processing unit that performs a contour emphasis process on the first image data and the second image data.

According to the present aspect, at least one of the restoration process arithmetic, the tone correction arithmetic, or the contour emphasis correction is common to the image processing on the first image data and the image processing on the second image data. Accordingly, in the present aspect, since a part of an image processing circuit is commonly used, it is possible to simplify the design of the image processing circuit.

Preferably, the image processing device further comprises: a light amount ratio detection unit that detects a light amount ratio between a light amount of the visible light and a light amount of the near-infrared ray in the second image data. The second restoration processing unit uses the second restoration filters generated based on a modulation transfer function of the visible light of the optical system and a modulation transfer function of the near-infrared ray of the optical system depending on the light amount ratio detected by the light amount ratio detection unit.

According to the present aspect, the second restoration filters are generated based on the modulation transfer function related to the visible light and the modulation transfer function related to the near-infrared ray depending on the light amount ratio between the light amount of the visible light and the light amount of the near-infrared ray. Accordingly, in the present aspect, since it is possible to perform the second restoration process by using the restoration filters appropriate for the image using the visible light and the near-infrared ray as the light source, it is possible to more effectively perform the point image restoration process.

Preferably, the image processing device further comprises: a storage unit that stores the first restoration filters and the second restoration filters.

According to the present aspect, since the first restoration filters and the second restoration filters are stored in the storage unit and the restoration filters stored in the storage unit are used by the first restoration processing unit and the second restoration processing unit, it is possible to reduce the calculation load for generating the restoration filters.

Preferably, the image processing device further comprises: a filter generation unit that generates the first restoration filters and the second restoration filters.

According to the present aspect, since the first restoration filters and the second restoration filters are generated by the filter generation unit and the restoration filters generated in the generation unit are used by the first restoration processing unit and the second restoration processing unit, it is possible to reduce a storage capacity for storing the restoration filters.

An imaging device which is another aspect of the present invention comprises: an optical system; a near-infrared ray emitting unit that emits a near-infrared ray as auxiliary light; an image acquisition unit that acquires image data imaged with sensitivity to a visible light wavelength band and a near-infrared ray wavelength band by using the optical system; a determination unit that determines whether the image data is first image data using a near-infrared ray as a light source and second image data using a near-infrared ray and visible light as a light source; a first restoration processing unit that performs a first restoration process using first restoration filters for performing phase correction and amplitude restoration on the acquired first image data, the first restoration filters being based on a first point spread function for a near-infrared ray of the optical system; and a second restoration processing unit that performs a second restoration process using second restoration filters for performing amplitude restoration without phase correction on the acquired second image data, the second restoration filters being based on a second point spread function for visible light and a near-infrared ray of the optical system.

According to the present aspect, the first restoration process of performing the phase correction and the amplitude restoration is performed on the first image data using the near-infrared ray as the light source, and the second restoration process of performing the amplitude restoration without the phase correction is performed on the second image data using the near-infrared ray and the visible light as the light source. Accordingly, in the present aspect, it is possible to more accurately correct blurring caused in first image data of an image using a near-infrared ray as a light source and accurately perform a point image restoration process on second image data of an image using visible light and a near-infrared ray as a light source.

Preferably, an image surface position is set using a case where the image acquisition unit images a visible light image as a criterion.

According to the present aspect, the position of the image surface of the image acquisition unit is set by using a case where the visible light image is imaged as its criterion. Accordingly, in the present aspect, it is possible to acquire the image which is in focus in a case where the visible light image is imaged, and the focus shift is also suppressed since there is a difference in a wavelength between the visible light and the near-infrared ray in a case where the near-infrared ray image is imaged.

An image processing method which is still another aspect of the present invention comprises: an image input step of receiving image data imaged with sensitivity to a visible light wavelength band and a near-infrared ray wavelength band by using an optical system; a determination step of determining whether the image data is first image data using a near-infrared ray as a light source or second image data using a near-infrared ray and visible light as a light source; a first restoration processing step of performing a first restoration process using first restoration filters for performing phase correction and amplitude restoration on the first image data determined in the determination step, the first restoration filters being based on a first point spread function for a near-infrared ray of the optical system; and a second restoration processing step of performing a second restoration process using second restoration filters for performing amplitude restoration without phase correction on the second image data determined in the determination step, the second restoration filters being based on a second point spread function for visible light and a near-infrared ray of the optical system.

A program which is still another aspect of the present invention causes a computer to perform: an image input step of receiving image data imaged with sensitivity to a visible light wavelength band and a near-infrared ray wavelength band by using an optical system; a determination step of determining whether the image data is first image data using a near-infrared ray as a light source or second image data using a near-infrared ray and visible light as a light source; a first restoration processing step of performing a first restoration process using first restoration filters for performing phase correction and amplitude restoration on the first image data determined in the determination step, the first restoration filters being based on a first point spread function for a near-infrared ray of the optical system; and a second restoration processing step of performing a second restoration process using second restoration filters for performing amplitude restoration without phase correction on the second image data determined in the determination step, the second restoration filters being based on a second point spread function for visible light and a near-infrared ray of the optical system. The aspect of the present invention includes a non-transitory computer-readable tangible medium having the program recorded thereon.

According to the present invention, since the first restoration process of performing the phase correction and the amplitude restoration is performed on the first image data of the image using the near-infrared ray as the light source and the second restoration process of performing the amplitude restoration without the phase correction is performed on the second image data of the image using the near-infrared ray and the visible light as the light source, it is possible to effectively perform the point image restoration process by more accurately correcting the blurring of the image using the near-infrared ray as the light source, and it is possible to accurately perform the point image restoration process on the image using the near-infrared ray and the visible light as the light source.

BRIEF DESCRIPTION OF THE DRAWINGS

FIGS. 14A and 14B are diagrams for describing the focus and the positional relationship between the image forming surface and the image surface of the imaging element.

DESCRIPTION OF THE PREFERRED EMBODIMENTS

Embodiments of the present invention will be described with reference to the accompanying drawings. In the following embodiments, a digital camera (imaging device) to be used as an example of a surveillance camera capable of being connected to a computer (personal computer) will be described.

Figure 1:
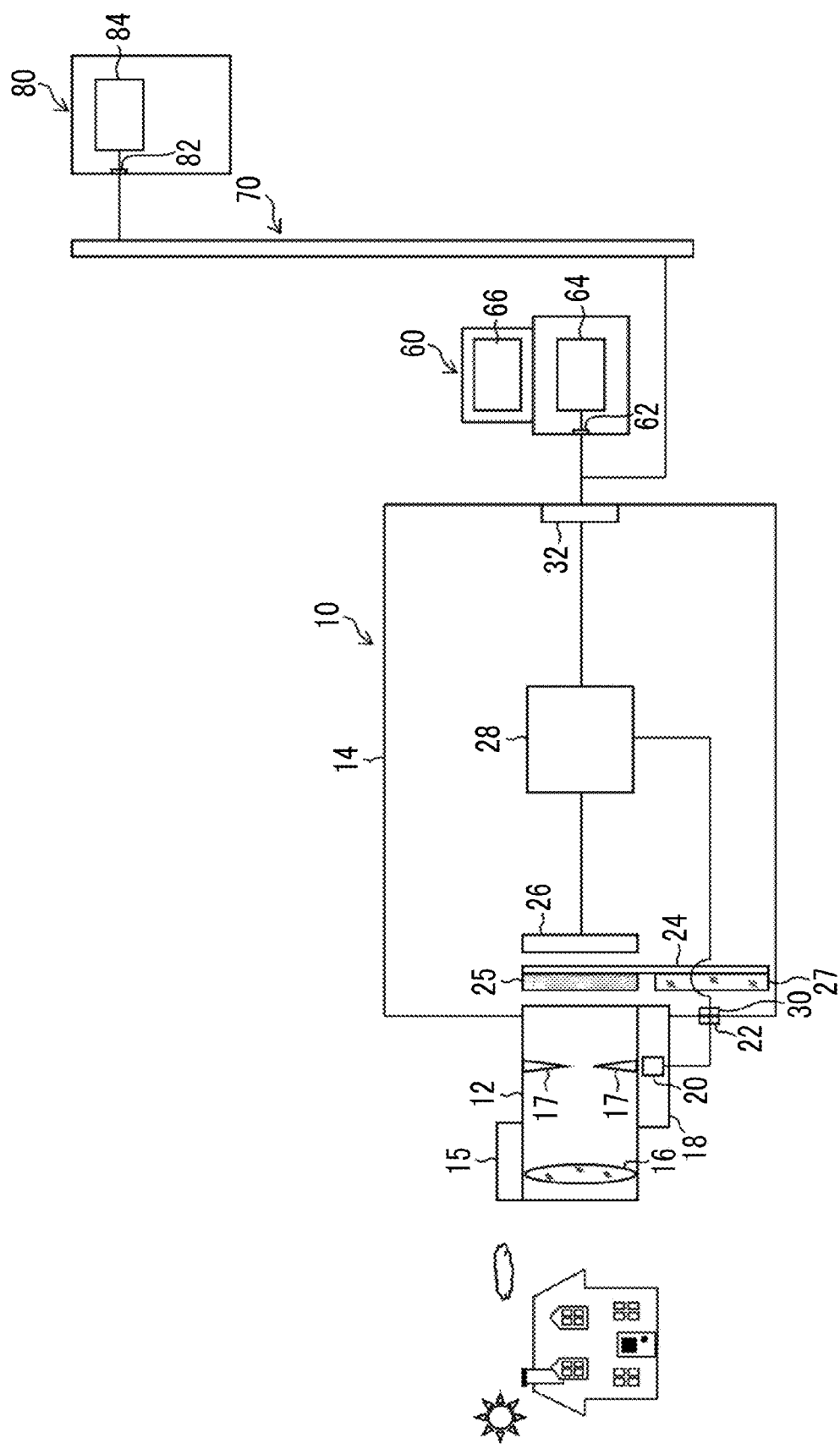
FIG. 1 is a block diagram showing a functional configuration example of a digital camera.

FIG. 1 is a block diagram showing a functional configuration example of a digital camera 10 connected to a computer. The digital camera 10 is capable of imaging a video or a still image, and an image or image data in the following description means an image or a still image of one frame in the video. FIG. 1 shows a case where the imaging is performed by the digital camera 10 in the daytime.

The digital camera 10 includes a lens unit 12 and a camera main body 14 including an imaging element (image acquisition unit) 26, and the lens unit 12 and the camera main body 14 are electrically connected through a lens-unit input and output unit 22 of the lens unit 12 and a camera-main-body input and output unit 30 of the camera main body 14.

The lens unit 12 includes an optical system such as a lens 16 or a stop 17, and an optical system operation unit 18 that controls the optical system. The optical system operation unit 18 includes a manual operation unit that adjusts a focus position of the lens 16 and a stop driving unit that drives the stop 17 by using a control signal to be applied from a camera main body controller 28.

The lens unit 12 includes a near-infrared ray emitting unit 15. The near-infrared ray emitting unit 15 emits a near-infrared ray as auxiliary light in a case where image data using a near-infrared ray as a light source is acquired by the digital camera 10. That is, in a case where the digital camera 10 performs imaging in the twilight or the nighttime, since the near-infrared ray is emitted as the auxiliary light from the near-infrared ray emitting unit 15, the digital camera 10 may acquire a clear near-infrared ray image.

In this example, the image data (first image data) of the image using the near-infrared ray as the light source is acquired by being imaged with sensitivity to a near-infrared ray wavelength band. That is, the image data of the image using the near-infrared ray as the light source is not acquired in a case where there is the visible light as in the daytime or the twilight, and is acquired in a case where there is no visible light as in the nighttime and the near-infrared ray is emitted by the near-infrared ray emitting unit 15. In this example, a wavelength of the near-infrared ray is not particularly limited, and ranges, for example, from 0.7 μm to 2.5 μm. Image data (second image data) of an image using the near-infrared ray and the visible light as the light source is acquired by being imaged with sensitivity to the visible light wavelength band and the near-infrared ray wavelength band. That is, the image data of the image using the near-infrared ray and the visible light as the light source is acquired in a case where the IR cut filter 25 retreats from the imaging optical path, the near-infrared ray is emitted by the near-infrared ray emitting unit 15, and there is the visible light as in the twilight.

The infrared (IR) cut filter (infrared ray cut filter) 25 is provided in a cut filter operation mechanism 24. In a case where the imaging is performed using the digital camera 10 in the daytime, the IR cut filter 25 is inserted into the imaging optical path as shown in FIG. 1, and the digital camera 10 performs the imaging in a visible light imaging mode (color imaging mode). The IR cut filter 25 is inserted into the imaging optical path, and thus, the IR cut filter 25 shields an infrared ray. Thus, the infrared ray does not reach the imaging element 26. Various filters may be used as the IR cut filter 25, and is used, for example, as a near-infrared cut filter capable of shielding the near-infrared ray.

A dummy filter 27 is provided in the cut filter operation mechanism 24 similarly to the IR cut filter 25. In a case where the IR cut filter 25 retreats from the imaging optical path, the dummy filter 27 is inserted into the imaging optical path (see FIG. 2). The dummy filter 27 is not particularly limited, and various filters may be used as the dummy filter. For example, transparent glass is used as the dummy filter 27. Even in a case where the IR cut filter 25 retreats from the imaging optical path, the dummy filter 27 has a function of maintaining a position of an image forming surface of the visible light.

The imaging element (image acquisition unit) 26 of the camera main body 14 is a complementary metal-oxide semiconductor (CMOS) type color image sensor. The imaging element 26 is not limited to the CMOS type, and may be an XY address type or charge-coupled device (CCD) type image sensor.

The imaging element 26 includes a plurality of pixels arranged in a matrix shape, and each pixel includes a microlens, a color filter of red (R), green (G), or blue (B), and a photoelectric conversion unit (photodiode). The RGB color filters have a filter array (Bayer array or X-Trans (registered trademark) array) of a predetermined pattern.

The imaging element 26 of the present example outputs original image data by imaging a subject image using the optical system, and the original image data is transmitted to an image processing unit 35 of the camera main body controller 28.

Figure 3:
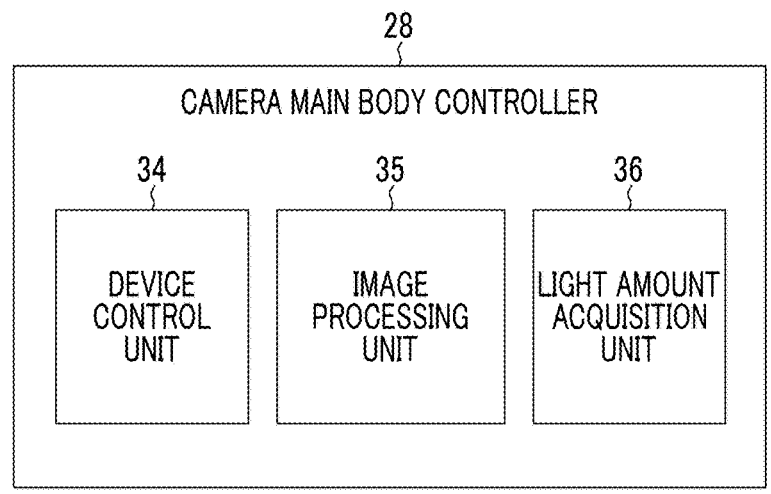
FIG. 3 is a block diagram showing a functional configuration example of a camera main body controller.

The camera main body controller 28 includes a device control unit 34, the image processing unit (image processing device) 35, and a light amount acquisition unit 36 as shown in FIG. 3, and generally controls the camera main body 14. For example, the device control unit 34 controls an output of an image signal (image data) from the imaging element 26, generates a control signal for controlling the lens unit 12, transmits the generated control signal to the lens unit 12 (lens unit controller 20) through the camera-main-body input and output unit 30, and transmits image data (RAW data or JPEG data) acquired before and after the image processing to an external device (computer 60) connected through an input and output interface 32. The device control unit 34 appropriately controls various devices included in the digital camera 10.

The image processing unit 35 may perform arbitrary image processing on the image signal from the imaging element 26 when necessary. Particularly, the image processing unit 35 of the present example includes a first restoration processing unit 3 (FIG. 6) that performs a restoration process (point image restoration process) on the first image data based on a point spread function of the optical system and a second restoration processing unit 5 (FIG. 6) that performs the restoration process on the second image data based on the point spread function of the optical system. The details of the image processing unit 35 will be described below.

The light amount acquisition unit 36 acquires a light amount of the imaged subject. The light amount acquisition unit 36 may acquire the light amount of the subject by various known methods. For example, the light amount acquisition unit 36 acquires an output value of a signal acquired from the imaging element 26 and an imaging condition (F-number, sensitivity, and shutter speed) from the device control unit 34, and may acquire the light amount of the subject.

The image data on which the image processing is performed in the camera main body controller 28 is sent to the computer 60 through the input and output interface 32. A format of the image data sent to the computer 60 from the digital camera 10 (camera main body controller 28) is not particularly limited, and an arbitrary format such as RAW, the Joint Photographic Experts Group (JPEG), or Tagged Image File Format (TIFF) may be used. Accordingly, the camera main body controller 28 may correlate a plurality of associated data items such as header information (imaging information (an imaging date and time, a device type, the number of pixels, a stop value, the presence or absence of the IR cut filter 25, or the presence and absence of the dummy filter 27)), main image data, and thumbnail image data with each other, may generate the correlated data items as one image file like Exchangeable image file format (Exif), and may transmit the generated image file to the computer 60.

The computer 60 is connected to the digital camera 10 through the input and output interface 32 of the camera main body 14 and a computer input and output unit 62, and receives data items such as image data sent from the camera main body 14. A computer controller 64 generally controls the computer 60, performs image processing on the image data from the digital camera 10, and controls communication with a server 80 connected to the computer input and output unit 62 through a network line such as the Internet 70. The computer 60 includes a display 66, and displays the image transmitted from the digital camera 10. The processing contents of the computer controller 64 are displayed on the display 66 when necessary. A user may input data or commands to the computer controller 64 by operating input means (not shown) such as a keyboard while checking display data on the display 66. Accordingly, the user may control the computer 60 or devices (digital camera 10 or the server 80) connected to the computer 60.

The server 80 includes a server input and output unit 82 and a server controller 84. The server input and output unit 82 constitutes a transmission and reception connection unit with respect to external devices such as the computer 60, and is connected to the computer input and output unit 62 of the computer 60 through the network line such as the Internet 70. In response to a control instruction signal from the computer 60, the server controller 84 cooperates with the computer controller 64, performs the transmission and reception of data items with the computer controller 64, and downloads the data items to the computer 60. Further, the server controller performs an arithmetic process on the data items, and transmits the arithmetic result to the computer 60.

The controllers (the lens unit controller 20, the camera main body controller 28, the computer controller 64, and the server controller 84) each have circuits required in a control process, and each include, for example, an arithmetic processing circuit (central processing unit (CPU)), or a memory. Communication between the digital camera 10, the computer 60, and the server 80 may be performed in a wired or a wireless manner. The computer 60 and the server 80 may be integrally provided, or the computer 60 and/or the server 80 may not be provided. The digital camera 10 may directly perform the transmission and reception of data items between the digital camera 10 and the server 80 by having a function of communicating with the server 80.

Figure 2:
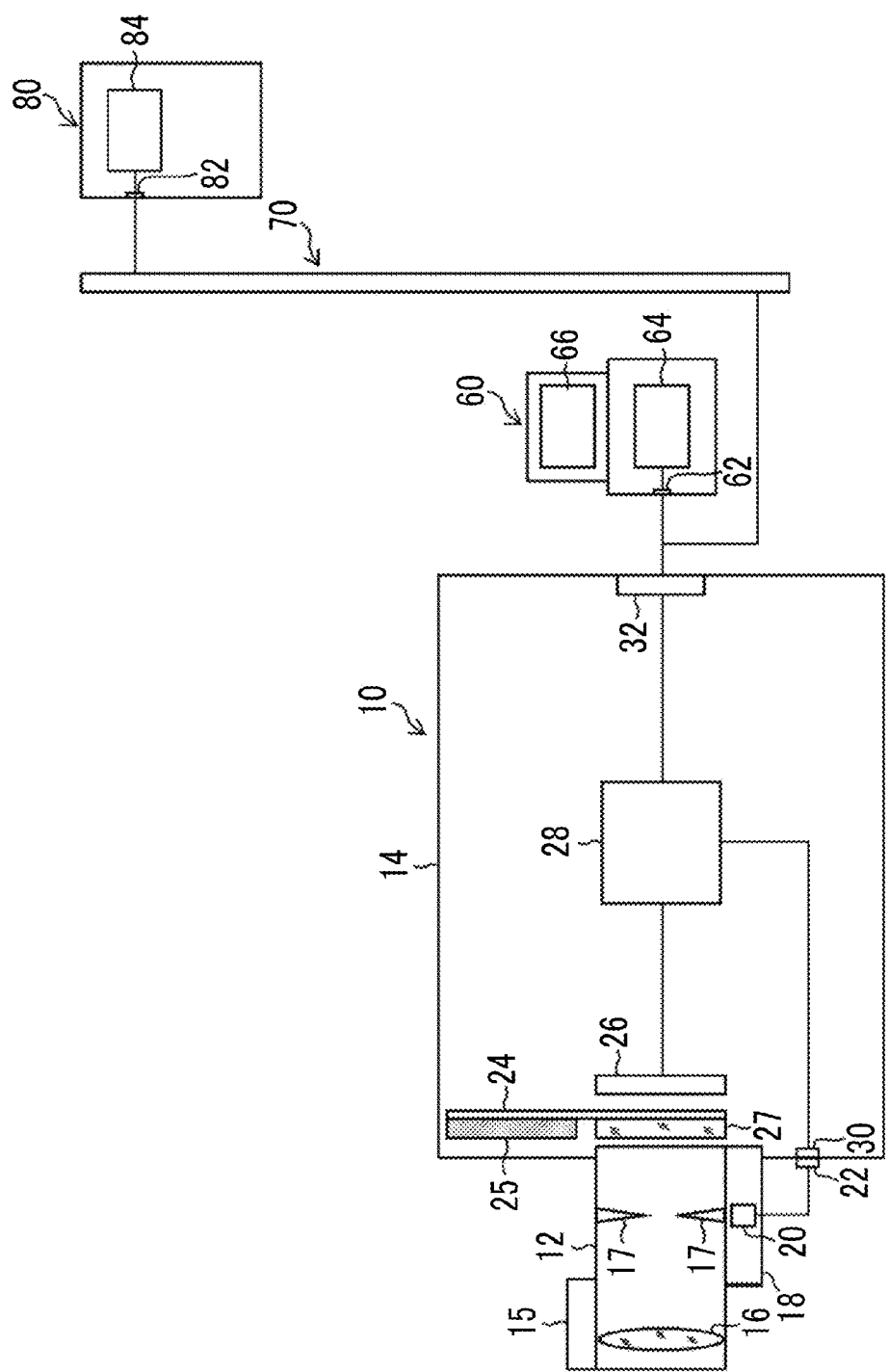
FIG. 2 is a diagram for describing a case where imaging is performed by the digital camera shown in FIG. 1 in the twilight.

FIG. 2 is a block diagram showing a case where the imaging is performed by the digital camera 10 shown in FIG. 1 for a period from the twilight (evening) to the nighttime. The components described in FIG. 1 will be assigned the same reference numerals, and the description will be omitted.

As shown in FIG. 2, in a case where the imaging is performed for a period from the twilight to the nighttime, the IR cut filter 25 retreats from the imaging optical path by the cut filter operation mechanism 24, the dummy filter 27 is inserted into the imaging optical path by the cut filter operation mechanism 24, and the digital camera 10 performs the imaging in a near-infrared ray imaging mode (black and white imaging mode). An optical path length is adjusted by inserting the dummy filter 27 into the imaging optical path, and the image is in focus in a case where the near-infrared ray image is imaged.

The dummy filter 27 instead of the IR cut filter 25 is inserted into the imaging optical path, and thus, the digital camera 10 may acquire the second image data of the image using the near-infrared ray and the visible light as the light source. Since the imaging is performed in the twilight or the nighttime, the near-infrared ray emitting unit 15 emits the near-infrared ray as the auxiliary light.

Figure 4:
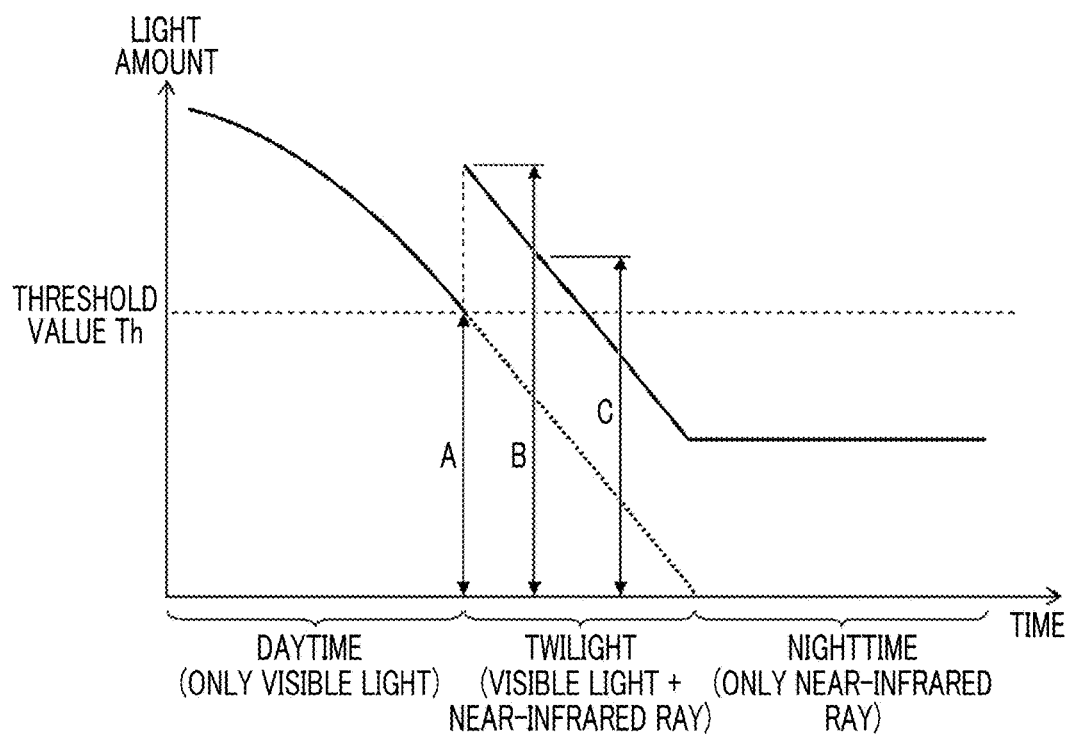
FIG. 4 is a graph showing a light amount at the time of imaging which is acquired by the digital camera.

FIG. 4 is a graph showing the light amount acquired by the light amount acquisition unit 36 in the daytime, twilight, and nighttime.

A lateral axis of the graph shown in FIG. 4 represents a time, and a vertical axis represents a light amount. In the daytime, the light amount acquisition unit 36 acquires the light amount in a state in which the IR cut filter 25 is inserted into the imaging optical path (visible light imaging mode) as shown in FIG. 1. In the daytime, the light amount acquired by the light amount acquisition unit 36 is changed depending on a position of the sun. That is, the light amount acquired by the light amount acquisition unit 36 in the daytime has a large value in a case where the sun is in a high position, and the light amount acquired by the light amount acquisition unit 36 in the daytime decreases as a height of the sun decreases.

In the case shown in FIG. 4, a threshold value Th is set, and in a case where the light amount is less than the threshold value Th, the mode is switched from the visible light imaging mode to the near-infrared ray imaging mode. In a case where the mode is changed to the near-infrared ray imaging mode, the near-infrared ray is emitted from the near-infrared ray emitting unit 15. Accordingly, the digital camera 10 may more clearly acquire the near-infrared ray image. The threshold value Th is not particularly limited, and is arbitrarily set. For example, the threshold value may be set by taking account of the fact that the sun gradually sinks and the twilight is started as shown in FIG. 4.

In a case where a light amount which is initially less than the threshold value Th is A, a light amount in a case where the mode is switched from the visible light imaging mode to the near-infrared ray imaging mode is B, and a light amount in an arbitrary time in the twilight is C, a light amount (light amount B−light amount A) acquired by subtracting the light amount A from the light amount B is a light amount corresponding to the near-infrared ray applied to the subject from the near-infrared ray emitting unit 15 and has a constant value. Accordingly, the light amount of the nighttime is a constant light amount of only near-infrared rays.

The light amount of the visible light in the twilight is a light amount (light amount C−(light amount B−light amount A)) acquired by subtracting a constant light amount (light amount B−light amount A) of only the near-infrared ray from the light amount C.

As will be described below, a light amount ratio detection unit 160 is provided in the restoration processing unit 71 (see FIG. 22), and light amount data (for example, exposure value: EV value) of the subject (not shown) is applied to the light amount ratio detection unit 160. The light amount ratio detection unit 160 detects a light amount ratio between the light amount (first light amount) of the visible light in the twilight and the light amount (second light amount) of the near-infrared ray based on the input light amount data.

That is, the light amount ratio detection unit 160 stores the light amount data (light amount A) in a case where the input light amount data is initially less than the threshold value Th and the light amount data (light amount B) in a case where the mode is switched to the infrared ray imaging mode, and then detects a light amount ratio between the light amount (light amount C−(light amount B−light amount A)) of the visible light in the twilight and the light amount (light amount B−light amount A) of the near-infrared ray based on the light amount data (light amount C) input in real time.

As described above, the light amount acquired by the light amount acquisition unit 36 is changed depending on the daytime, twilight, and nighttime. Accordingly, a determination unit 2 (FIG. 7) may determine the daytime, twilight, and nighttime based on the light amount acquired by the light amount acquisition unit 36. For example, in a case where the light amount acquired by the light amount acquisition unit 36 is acquired or represented as a graph at predetermined intervals as shown in FIG. 4, the determination unit 2 may determine the daytime, twilight, and nighttime. In a case where a timepiece (not shown) is provided in the digital camera 10, the determination unit 2 may also determine the daytime, twilight, and nighttime by a time. The determination unit 2 may determine the daytime, twilight, and nighttime by the time and the graph of the light amount acquired by the light amount acquisition unit 36.

Hereinafter, the point image restoration process performed on imaged data (first image data) of the image using the near-infrared ray acquired through the imaging element 26, as the light source and imaged data (second image data) of the image of the near-infrared ray and the visible light as the light source will be described.

Although it will be described in the following examples that the point image restoration process is performed in the camera main body 14 (camera main body controller 28), the entire point image restoration process or a part thereof may be performed in other controllers (the lens unit controller 20, the computer controller 64, and the server controller 84).

The point image restoration process of the present example includes a first restoration process using first restoration filters for performing phase correction and amplitude restoration and a second restoration process using second restoration filters for performing amplitude restoration without the phase correction.

First Embodiment

Initially, the first restoration process will be described.

Figure 5:
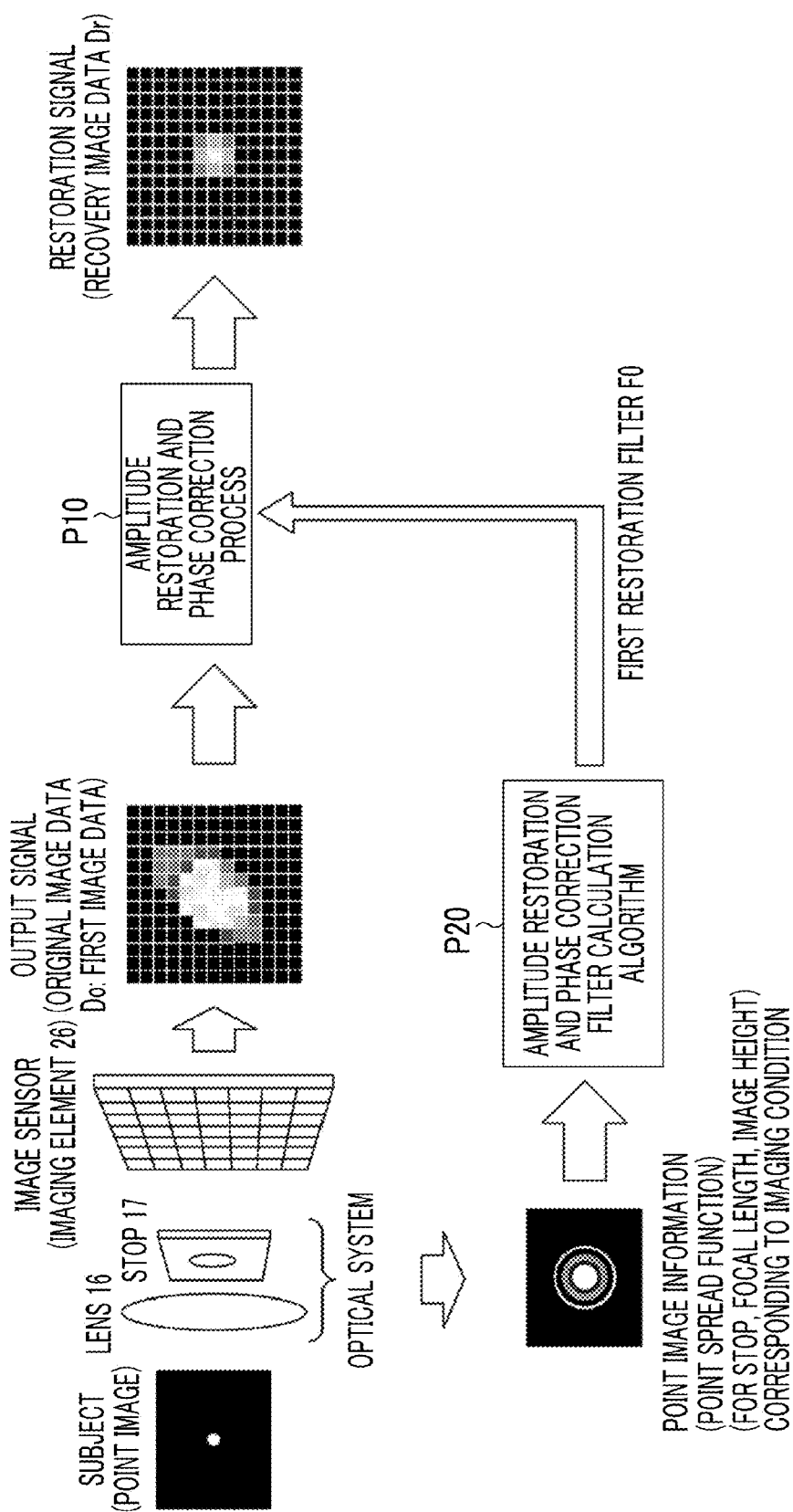
FIG. 5 is a diagram showing an outline of a first restoration process.

FIG. 5 is a diagram showing the outline of the first restoration process in a case where the first image data is acquired as original image data Do.

As shown in FIG. 5, in a case where a point image is imaged as a subject, the near-infrared ray image of the subject using the near-infrared ray as the light source is received by the imaging element 26 (image sensor) through the optical system (the lens 16 and the stop 17), and the first image data is output from the imaging element 26. An amplitude component and a phase component of the first image data deteriorate due to a point spread phenomenon caused by characteristics of the optical system, and the original subject image (point image) is a point-asymmetric blurred image.

The point image restoration process is a process of restoring a high-resolution image by acquiring characteristics of deterioration (the point spread function (PSF) or the optical transfer function (OTF)) due to an aberration of the optical system and performing the point image restoration process on the imaged image (deteriorated image) by using restoration filters generated based on the PSF or the OTF.

The PSF and the OTF have a relationship of Fourier transform. The PSF is a real function, and the OTF is a complex function. As functions having equivalent information to these functions, there are a modulation transfer function or an amplitude transfer function (MTF) and the phase transfer function (PTF). These functions indicate the amplitude component and the phase component of the OTF, respectively. The amount of information items of the MTF and the PTF is equivalent to that of the OTF or the PSF.

In general, a convolution type Wiener filter may be used in restoring the blurred image using the PSF. Frequency characteristics $d(\omega_x, \omega_y)$ of the restoration filter may be calculated by the following expression by referring to information of a signal-noise ratio (SNR) and the OTF acquired by performing Fourier transform on PSF(x, y).

$$d(\omega_x, y_y) = \frac{H^*(\omega_x, \omega_y)}{\|H(\omega_x, \omega_y)\|^2 + 1/SNR(\omega_x, y_y)} \quad \text{[Expression 1]}$$

Where, $H(\omega_x, \omega_y)$ represents the OTF, and $H^*(\omega_x, \omega_y)$ represents the complex conjugate. $SNR(\omega_x, \omega_y)$ represents a signal-noise (SN) ratio.

Designing filter coefficients of the restoration filter is an optimization problem of selecting coefficient values such that the frequency characteristics of the filter are closest to the desired Wiener frequency characteristics, and the filter coefficients are appropriately calculated by a known arbitrary method.

As shown in FIG. 5, in order to restore the original subject image (point image) from the original image data Do (first image data) the blurred image, an amplitude restoration and phase correction process (first restoration process) P10 using filters (first restoration filters F0) for performing amplitude restoration and phase correction is performed on the original image data Do. Thus, the amplitude of the point-asymmetric blurred image is restored, and the blurred image becomes small. Further, the point-asymmetric image moves depending on the frequency, and is recovered to a point-symmetric image. Accordingly, recovery image data Dr indicating an image (recovery image) closer to the original subject image (point image) is acquired. That is, an effective point image restoration process of more accurately correcting the blurring is performed. Here, for example, a case where the blurring is more accurately corrected means that the blurred image is corrected such that the blurred image is closer to the original point image.

The first restoration filters F0 used in the amplitude restoration and phase correction process (first restoration process) P10 are acquired by a predetermined amplitude restoration and phase correction filter calculation algorithm P20 from point image information (PSF and OTF) of the optical system corresponding to an imaging condition in a case where the original image data Do is acquired.

The point image information of the optical system may be changed depending on various imaging conditions such as a stop amount, a focal length, a zoom amount, an image height, the number of record pixels, and a pixel pitch in addition to the type of the lens 16. The point image information of the optical system may also be changed depending on the visible light and the near-infrared ray. Accordingly, in a case where the first restoration filters F0 are calculated, these imaging conditions are acquired.

The first restoration filters F0 are filters in a real space constituted, for example, by N×M (N and M are integers of 2 or more) taps, and are applied to image data as a processing target. Accordingly, a weighted averaging arithmetic (deconvolution arithmetic) is performed on the filter coefficients assigned to the taps and the corresponding pixel data items (processing target pixel data items and adjacent pixel data items of the image data), and thus, pixel data items acquired after the point image restoration process may be calculated. A weighted averaging process using the first restoration filters F0 is applied to all the pixel data items constituting the image data while sequentially changing the target pixels, and thus, the point image restoration process may be performed.

Although it has been described in the example shown in FIG. 5 that the amplitude restoration and the phase correction are performed together in the first restoration process, the present embodiment is not limited thereto. That is, the amplitude restoration process and the phase correction process may be performed as individual processes by calculating filters capable of performing the amplitude restoration and calculating filters capable of performing the phase correction in the first restoration process.

Hereinafter, the second restoration process will be described.

Figure 6:
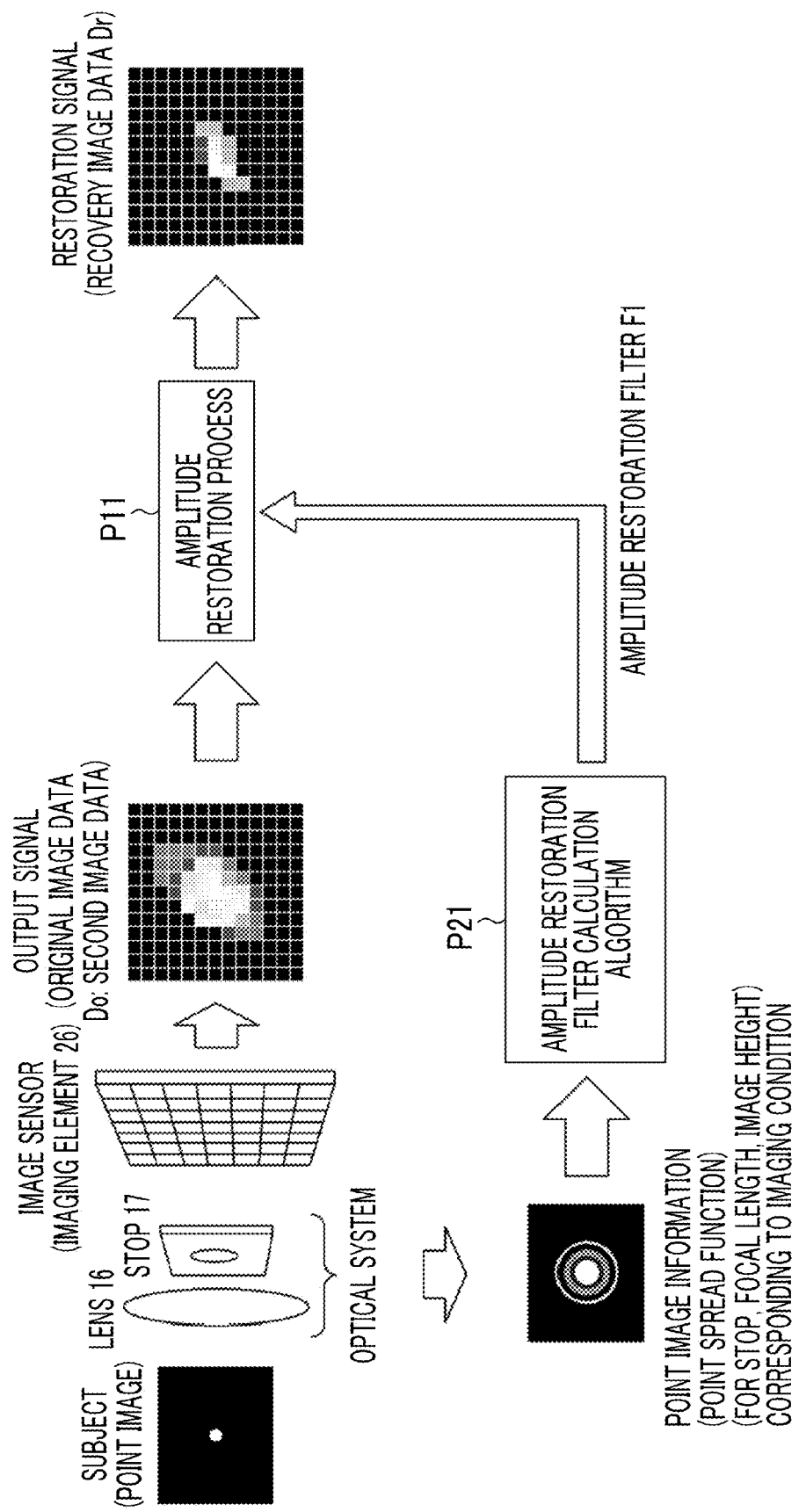
FIG. 6 is a diagram showing an outline of a second restoration process.

FIG. 6 is a diagram showing the outline of the second restoration process in a case where the second image data is acquired as the original image data Do.

As shown in FIG. 6, in a case where the point image is imaged as the subject, the image of the subject using the near-infrared ray and the visible light as the light source is received by the imaging element 26 (image sensor) through the optical system (lens 16 and the stop 17), and the second image data is output from the imaging element 26. An amplitude component and a phase component of the second image data deteriorate due to the point spread phenomenon caused by the characteristics of the optical system, and the original subject image (point image) becomes a point-asymmetric blurred image. In this example, the PSF acquired from mixed light of the near-infrared ray and the visible light which pass through the optical system is different from the PSF acquired from the near-infrared ray which passes through the optical system and the PSF acquired from the visible light which passes through the optical system. Thus, in order to prevent the point image restoration process from failing, a mild point image restoration process of performing only the amplitude restoration process is performed on the image data (second image data) of the image using the near-infrared ray and the visible light as the light source. Accordingly, the point image restoration process is not appropriately performed, but the acquisition of an unnatural image is prevented. Thus, it is possible to improve the accuracy of the point image restoration process. In this example, the accurate point image restoration process means that the point image restoration process fails but there is a low possibility that the image will become unnatural.

For example, in the second restoration processing unit 5, the frequency characteristics of the filter are calculated by using the MTF indicating the amplitude component of the OTF and the coefficient values are selected such that the calculated frequency characteristics of the filter are closest to the desired Wiener frequency characteristics. Thus, amplitude restoration filters F1 for recovering deterioration in the frequency characteristics are calculated (P21). In this case, the amplitude restoration filters F1 serve as the second restoration filters.

As shown in FIG. 6, in order to restore the original subject image (point image) from the original image data Do of the blurred image, an amplitude restoration process P11 using the amplitude restoration filters F1 is performed on the original image data Do. Thus, the amplitude of the point-asymmetric blurred image is restored, and the blurred image becomes small.

Hereinafter, the image processing device (image processing unit) 35 will be described.

Figure 7:
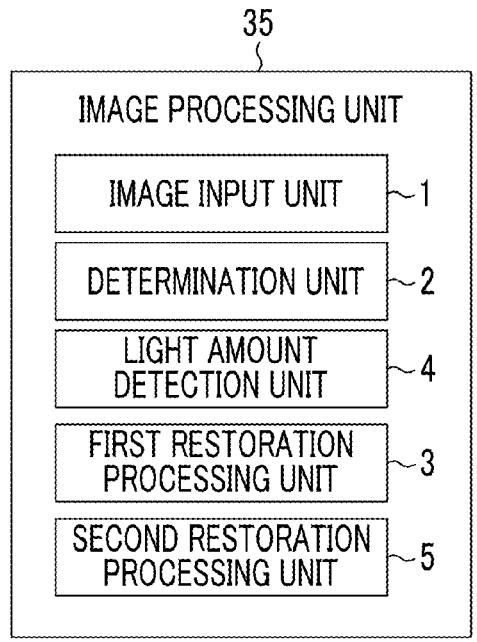
FIG. 7 is a block diagram showing a functional configuration example of an image processing unit.

FIG. 7 is a block diagram showing a functional configuration example of the image processing unit 35.

The image processing unit 35 includes an image input unit 1, the determination unit 2, a light amount detection unit 4, a first restoration processing unit 3, and a second restoration processing unit 5.

The first image data and the second image data are input to the image input unit 1. The method of inputting the data items to the image input unit 1 is not particularly limited. For example, the first image data and the second image data may be simultaneously input to the image input unit 1, or the first image data and the second image data may be input in different timings.

The determination unit 2 determines whether the input image data is the first image data using the near-infrared ray as the light source and the second image data using the near-infrared ray and the visible light as the light source. The determination unit 2 may determine whether the input image data is the first image data using the near-infrared ray as the light source or the second image data using the near-infrared ray and the visible light as the light source by various known methods. For example, the light amount acquired by the light amount acquisition unit 36 is detected by the light amount detection unit 4, and thus, the determination unit 2 may determine whether the input image data is the first image data or the second image data.

The determination unit 2 may determine whether the input image data is the first image data or the second image data based on the time of the timepiece (not shown) provided in the digital camera 10 or the image processing unit 35. The determination unit 2 may determine whether the input image data is the first image data or the second image data based on tag information items assigned to the first image data and the second image data input to the image input unit 1.

The light amount detection unit 4 detects the light amount of the image data. That is, the light amount detection unit 4 acquires the light amount in a case where the image data (for example, the first image data or the second image data) input to the image input unit 1 is acquired. For example, the light amount detection unit 4 acquires information related to the light amount in a case where the image data is acquired from the light amount acquisition unit 36 of the camera main body controller 28, and detects the light amount of the image data input to the image input unit 1. For example, the light amount detection unit 4 may detect the light amount by reading out the information related to the light amount assigned to the image data input to the image input unit 1.

The first restoration processing unit 3 performs the first restoration process using the first restoration filters which are based on the point spread function for the near-infrared ray of the optical system and performs the phase correction and the amplitude restoration. That is, the first restoration processing unit 3 performs the first restoration process on the first image data (the image data using the near-infrared ray as the light source) by using the first restoration filters generated based on the point spread function for the near-infrared ray of the optical system. The phase shift of the image on which the first restoration process is performed is corrected and the amplitude thereof is restored. Thus, an effective point image restoration process of more accurately correcting the blurring is performed.

The second restoration processing unit 5 performs the second restoration process on the second image data (the image data using the near-infrared ray and the visible light as the light source) by using the second restoration filters which are based on the point spread function of the optical system and performs the amplitude restoration without the phase correction. As stated above, since the mild point image restoration process of performing the amplitude restoration without the phase correction is performed on the second image data, the occurrence of the fail of the point image restoration process on the second image data is suppressed, and the accurate point image restoration process is performed.

As described above, the image processing unit (image processing device) 35 includes the first restoration processing unit 3 and the second restoration processing unit 5, and thus, each imaging device may not have a function of performing the point image restoration process in a case where the image processing unit 35 is provided in the computer.

Figure 8:
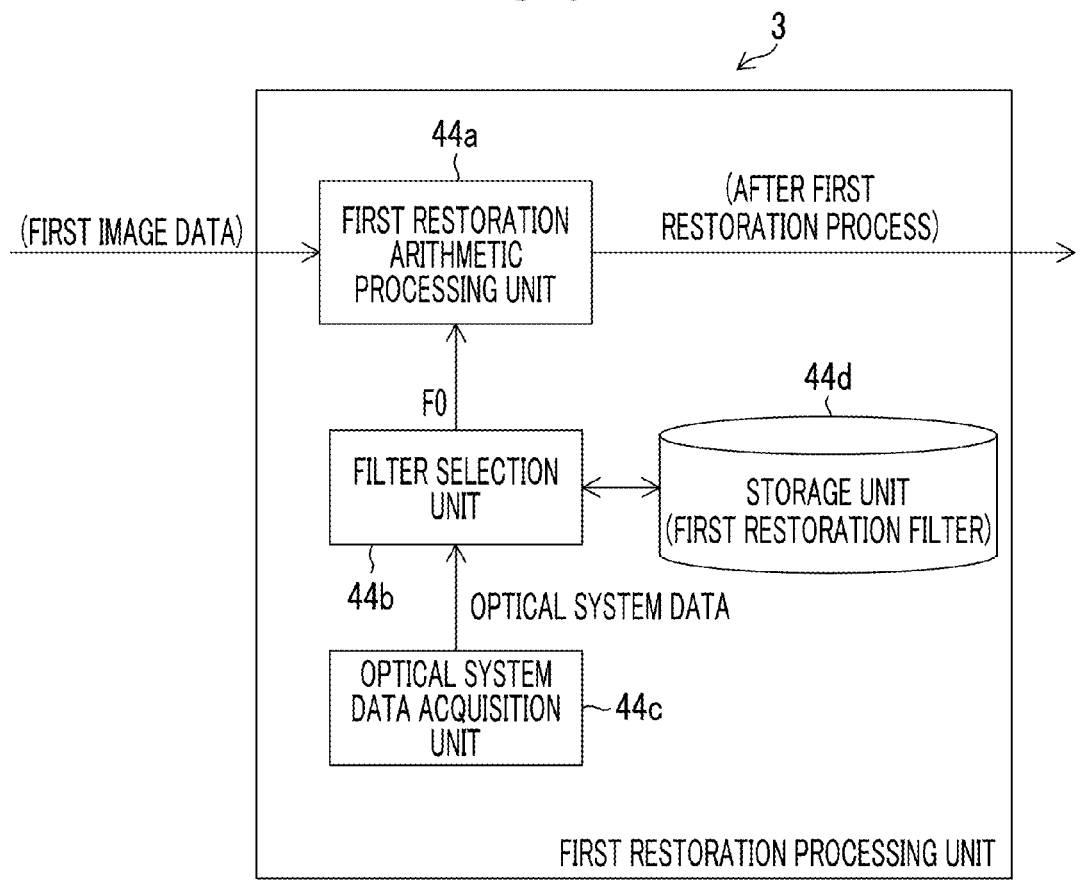
FIG. 8 is a block diagram showing a functional configuration example of a first restoration processing unit.

FIG. 8 is a block diagram showing a functional configuration example of the first restoration processing unit 3.

The first restoration processing unit 3 includes a first restoration arithmetic processing unit 44a, a filter selection unit 44b, an optical system data acquisition unit 44c, and a storage unit 44d.

The optical system data acquisition unit 44c acquires optical system data indicating the point spread function of the optical system (lens 16 or the stop 17). The optical system data may be data which is a selection criterion of the first restoration filters in the filter selection unit 44b, and may be information which directly or indirectly indicates the point spread function of the optical system used in a case where the first image data as the processing target is imaged and acquired. Accordingly, for example, the transfer function (PSF or OTF (MTF or PTF)) related to the point spread function of the optical system may be used as the optical system data, or the type (for example, a model number of the lens unit 12 (lens 16) used in the imaging) of the optical system which indirectly indicates the transfer function related to the point spread function of the optical system may be used as the optical system data. Information items such as an F-number (stop value), a zoom value, and an image height in a case where the image is imaged may be used as the optical system data.

The storage unit 44d stores first restoration filters which are generated based on the transfer functions (PSF, OTF, or PTF and MTF) related to point spread functions of multiple types of optical systems. Preferably, the storage unit 44d stores the first restoration filters corresponding to the stop value (F-number), the focal length, and the image height. This is because the shape of the PSF is different depending on these conditions.

The filter selection unit 44b selects the first restoration filters corresponding to the optical system data of the optical system used in a case where the first image data is imaged and acquired, among the first restoration filters stored in the storage unit 44d, based on the optical system data acquired by the optical system data acquisition unit 44c. The first restoration filters F0 selected by the filter selection unit 44b are sent to the first restoration arithmetic processing unit 44a.

The filter selection unit 44b recognizes type information (first restoration filter storage information) of the first restoration filters stored in the storage unit 44d, and the method of recognizing the first restoration filter storage information by means of the filter selection unit 44b is not particularly limited. For example, the filter selection unit 44b may include a storage unit (not shown) that stores the first restoration filter storage information, or may also change the first restoration filter storage information stored in the storage unit of the filter selection unit 44b in a case where the type information of the first restoration filters stored in the storage unit 44d is changed. The filter selection unit 44b may be connected to the storage unit 44d, and may directly recognize the "information of the first restoration filters stored in the storage unit 44d", or may recognize the first restoration filter storage information from another processing unit (memory) that recognizes the first restoration filter storage information.

The filter selection unit 44b may select the first restoration filters F0 corresponding to the PSF of the optical system used in a case where the first image data is imaged and acquired, and the selection method is not particularly limited. For example, in a case where the optical system data from the optical system data acquisition unit 44c directly indicates the PSF, the filter selection unit 44b selects the first restoration filters F0 corresponding to the PSF indicated by the optical system data. In a case where the optical system data from the optical system data acquisition unit 44c indirectly indicates the PSF, the filter selection unit 44b selects the first restoration filters F0 corresponding to the PSF of the optical system used in a case where the first image data as the processing target is imaged and acquired from the "optical system data indirectly indicating the PSF".

First image data (image data using the near-infrared ray as the light source) is input to the first restoration arithmetic processing unit 44a. The first restoration arithmetic processing unit 44a performs the first restoration process using the first restoration filters F0 selected by the filter selection unit 44b on the first image data, and calculates the image data after the first restoration process. That is, the first restoration arithmetic processing unit 44a performs the deconvolution arithmetic of the first restoration filters F0 and the corresponding image data (processing target pixel data items and adjacent pixel data items), and calculates the first image data on which the first restoration process is performed.

The first restoration processing unit 3 having the above-described configuration is able to perform the phase correction process in which the phase transfer function (PTF) is reflected, and performs the effective point image restoration process of more accurately correcting the blurring.

Figure 9:
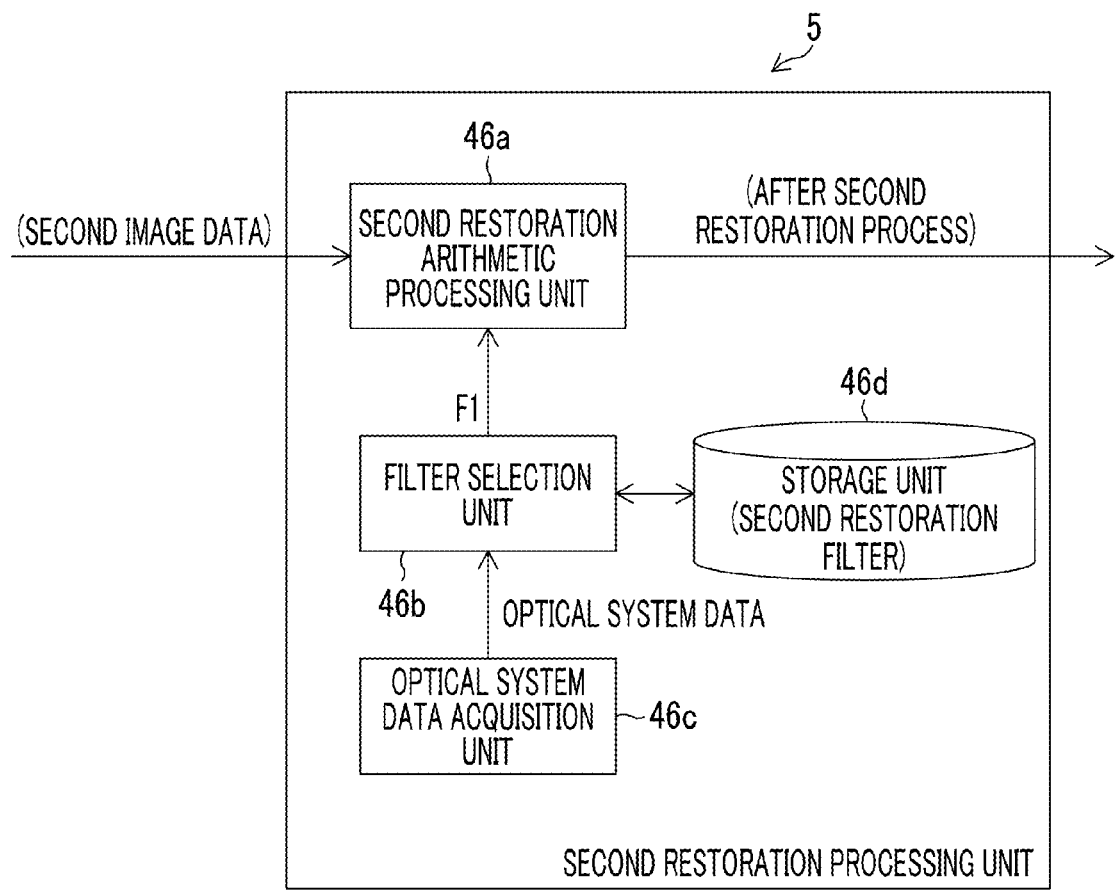
FIG. 9 is a block diagram showing a functional configuration example of a second restoration processing unit.

FIG. 9 is a block diagram showing a functional configuration example of the second restoration processing unit 5.

The second restoration processing unit 5 includes a second restoration arithmetic processing unit 46a, a filter selection unit 46b, an optical system data acquisition unit 46c, and a storage unit 46d.

Since the filter selection unit 46b and the optical system data acquisition unit 46c respectively correspond to the filter selection unit 44b and the optical system data acquisition unit 44c shown in FIG. 8, the detailed description thereof will be omitted.

The storage unit 46d stores the second restoration filters generated based on the PSF, OTF, or MTF of multiple types of optical systems. Preferably, the storage unit 46d stores the second restoration filters corresponding to the stop value (F-number), the focal length, and the image height. This is because the shape of the PSF is different depending on these conditions.

The filter selection unit 46b selects the second restoration filters corresponding to the optical system data of the optical system used in a case where the original image data is imaged and acquired among the second restoration filters stored in the storage unit 46d based on the optical system data acquired by the optical system data acquisition unit 46c. The second restoration filters selected by the filter selection unit 46b are sent to the second restoration arithmetic processing unit 46a.

The second restoration arithmetic processing unit 46a performs the second restoration process using the second restoration filters selected by the filter selection unit 46b on the second image data.

The storage unit 44d (FIG. 8) that stores the first restoration filters and the storage unit 46d (FIG. 9) that stores the second restoration filters may be individually provided, or these storage units may be physically the same but have different storage areas.

Although it has been described in the present example that the first restoration filters and the second restoration filters are respectively stored in the storage units 44d and 46d and the first restoration filters and the second restoration filters to be used in the point image restoration process are appropriately read out, the present embodiment is not limited thereto. That is, in the present example, the transfer functions (PSF, OTF, PTF, and MTF) of the optical system may be stored in the storage unit, the transfer function to be used in the point image restoration process may be read out from the storage unit in a case where the point image restoration process is performed, and a filter generation unit may be provided such that the first restoration filters and the second restoration filters are sequentially generated. Although it has been described above that the first restoration processing unit 3 (FIG. 8) and the second restoration processing unit 5 (FIG. 9) are provided as individual processing units, the present embodiment is not limited thereto. For example, the first restoration process and the second restoration process may be performed by one restoration processing unit having both functions of the first restoration processing unit 3 and the second restoration processing unit 5.

A functional configuration example of the image processing unit 35 is not limited to the example described in FIG. 7. For example, the image processing unit 35 may include a visible light restoration processing unit 6 that performs the restoration process on the visible light image data which is the image data using only the visible light as the light source.

Figure 10:
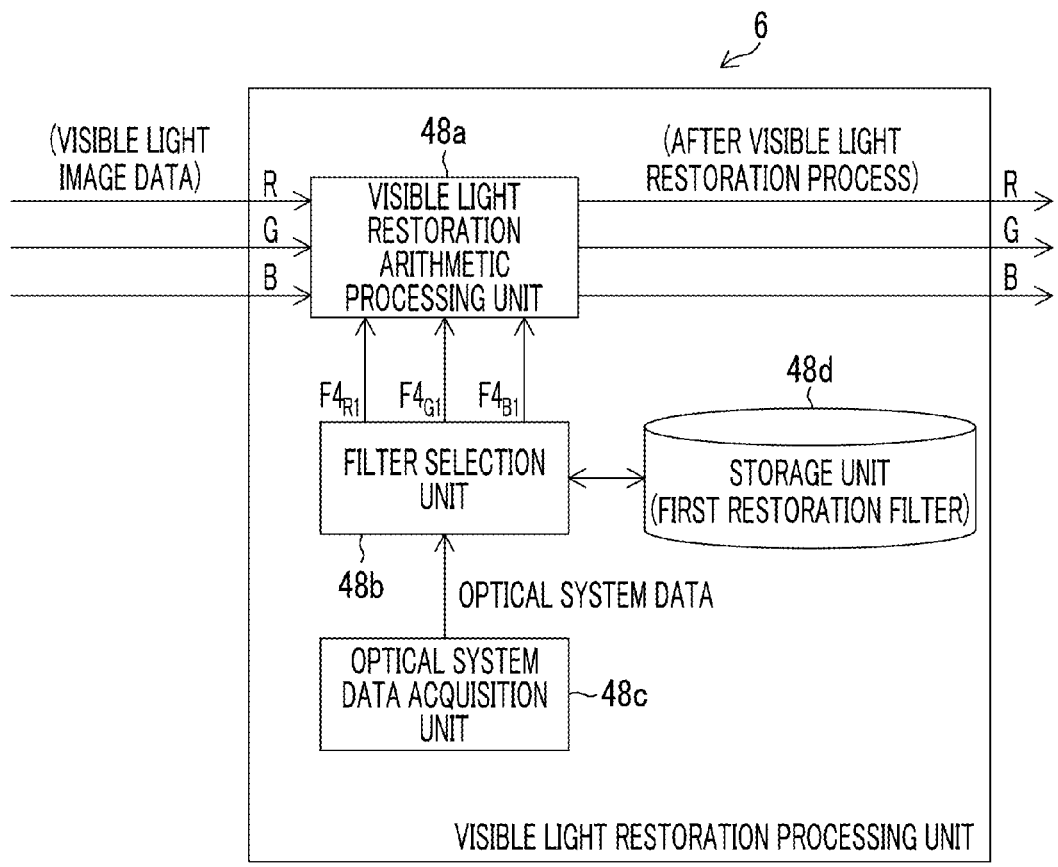
FIG. 10 is a block diagram showing a functional configuration example of a visible light restoration processing unit.

FIG. 10 is a block diagram showing a functional configuration example of the visible light restoration processing unit 6.

The visible light restoration processing unit 6 includes a visible light restoration arithmetic processing unit 48a, a filter selection unit 48b, an optical system data acquisition unit 48c, and a storage unit 48d.

The optical system data acquisition unit 48c acquires optical system data indicating the point spread function of the optical system (lens 16 or the stop 17). The optical system data items may be data items which are selection criteria of the visible light restoration filters of the filter selection unit 48b, and may be information which directly or indirectly indicates the point spread function of the optical system used in a case where the visible light image data as the processing target is imaged and acquired. Accordingly, for example, the transfer function (PSF or OTF (MTF or PTF)) related to the point spread function of the optical system may be used as the optical system data, or the type (for example, a model number of the lens unit 12 (lens 16) used the imaging) of the optical system which indirectly indicates the transfer function related to the point spread function of the optical system may be used as the optical system data. An F-number (stop value) and a zoom value in a case where the image is imaged and information such image height may be used as the optical system data.

The storage unit 48d stores visible light restoration filters ($F4_{R1}$, $F4_{G1}$, and $F4_{B1}$) for RGB which are generated based on the transfer functions (PSF, OTF, or PTF and MTF) related to point spread functions of multiple types of optical systems. The reason why the visible light restoration filters ($F4_{R1}$, $F4_{G1}$, and $F4_{B1}$) for RGB are stored is because the aberration of the optical system is different depending on the wavelength of each color of the RGB (the shape of the PSF is different). Preferably, the storage unit 48d stores the visible light restoration filters ($F4_{R1}$, $F4_{G1}$, and $F4_{B1}$) corresponding to the stop value (F-number), the focal length, and the image height. The shape of the PSF is different depending on these conditions. In this example, G indicates a green color, and is a first color which contributes to acquisition of luminance data the most. R indicates a red color, and is one of two or more second colors other than the first color. B indicates a blue color, and is one of the two or more second colors other than the first color.

The filter selection unit 48b selects the visible light restoration filters corresponding to the optical system data items of the optical system used in a case where the visible light image data is imaged and acquired among the visible light restoration filters stored in the storage unit 48d based on the optical system data items acquired by the optical system data acquisition unit 48c. The visible light restoration filters ($F4_{R1}$, $F4_{G1}$, and $F4_{B1}$) for RGB which are selected by the filter selection unit 48b are sent to the visible light restoration arithmetic processing unit 48a.

The filter selection unit 48b recognizes type information (visible light restoration filter storage information) of the visible light restoration filters stored in the storage unit 48d, and the method of recognizing the visible light restoration filter storage information by means of the filter selection unit 48b is not particularly limited. For example, the filter selection unit 48b may include a storage unit (not shown) of storing the visible light restoration filter storage information, or may also change the visible light restoration filter storage information stored in the storage unit of the filter selection unit 48b in a case where the type information of the first restoration filters stored in the storage unit 48d are changed. The filter selection unit 48b may be connected to the storage unit 48d, and may directly recognize "the information of the visible light restoration filters stored in the storage unit 48d", or may recognize the visible light restoration filter storage information from another processing unit (memory) that recognizes the first restoration filter storage information.

The filter selection unit 48b may select the visible light restoration filters corresponding to the PSF of the optical system items used in a case where the visible light image data is imaged and acquired, and the selection method is not particularly limited. For example, in a case where the optical system data from the optical system data acquisition unit 48c directly indicates the PSF, the filter selection unit 48b selects the visible light restoration filters corresponding to the PSF indicated by the optical system data. In a case where the optical system data from the optical system data acquisition unit 48c indirectly indicates the PSF, the filter selection unit 48b selects the visible light restoration filters corresponding to the PSF of the optical system items used in a case where the visible light image data as the processing target is imaged and acquired from the "optical system data indirectly indicating the PSF".

Visible light image data (RGB data items) on which a demosaic process is performed is input to the visible light restoration arithmetic processing unit 48a. The visible light restoration arithmetic processing unit 48a performs the visible light restoration process using the visible light restoration filters ($F4_{R1}$, $F4_{G1}$, and $F4_{B1}$) selected by the filter selection unit 48b on the RGB data items, and calculates the image data after the visible light restoration process. That is, the visible light restoration arithmetic processing unit 48a performs the deconvolution arithmetic of the visible light restoration filters ($F4_{R1}$, $F4_{G1}$, and $F4_{B1}$) and the pixel data items of the corresponding RGB (processing target pixel data items and adjacent pixel data items), and calculates the RGB data items on which the visible light restoration process is performed.

The visible light restoration processing unit 6 may perform the intense point image restoration process of performing the amplitude restoration and the phase correction on the visible light image data, or may perform the point image restoration process of performing the amplitude restoration without the phase correction. In a case where the visible light restoration processing unit 6 performs the phase correction process in which the phase transfer functions (PTF) for color channels of RGB are reflected, an effective point image restoration process of more accurately correcting the blurring is performed. The visible light restoration processing unit 6 performs the phase correction process in which the phase transfer function (PTF) for the color channels of RGB is reflected, and thus, it is possible to correct various chromatic aberrations such as the lateral chromatic aberration.

Figure 11:
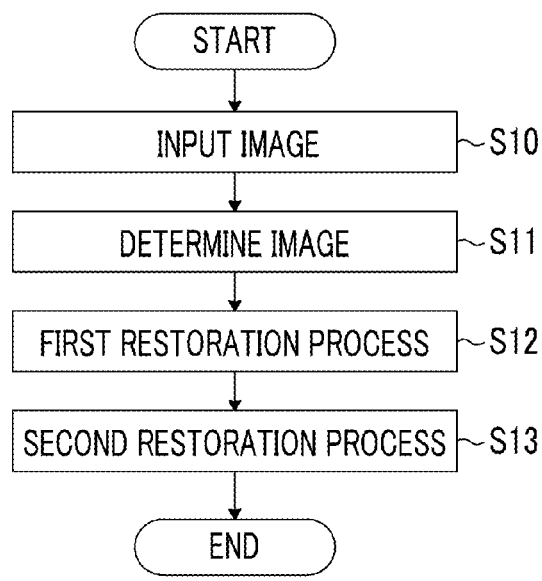
FIG. 11 is a flowchart showing an operation of the image processing device.

FIG. 11 is a flowchart showing an operation of the image processing unit (image processing device) 35.

Initially, the image data is input to the image processing unit 35 (step S10). Thereafter, the determination unit 2 determines whether the input image is the first image data or the second image data (step S11). Subsequently, the first restoration processing unit 3 performs the first restoration process on the first image data (step S12), and the second restoration processing unit 5 performs the second restoration process on the second image data (step S13).

The above-described configurations and functions may be appropriately implemented by arbitrary hardware, software, or the combination thereof. For example, the present invention may be applied to a program causing a computer to perform the above-described processing steps (processing procedure), a computer-readable recording medium (non-transitory tangible recording medium) having the program recorded thereon, or a computer in which the program is capable of being installed.

Hereinafter, settings related to the provision of the imaging element 26 of the digital camera 10 will be described.

FIGS. 12A to 15B are diagrams for describing the focus and the positional relationship between the image forming surface and the image surface of the imaging element 26. The lens unit 12, the imaging element 26, the IR cut filter 25, the cut filter operation mechanism 24, and a subject 19 are mainly illustrated in FIGS. 12A, 13A, 14A, and 15A. A focus ring 13, a focus adjustment lever 11, a zoom ring 23, and a zoom adjustment lever 21 are provided on a side surface of the lens unit 12. The image surface of the imaging element 26 illustrated in FIGS. 12A, 13A, 14A, and 15A is set by using a case where the visible light image is imaged as its criterion. Images of a subject image imaged under the respective imaging conditions of FIGS. 12A to 15A are depicted in FIGS. 12B, 13B, 14B, and 15B.

Figure 12A:
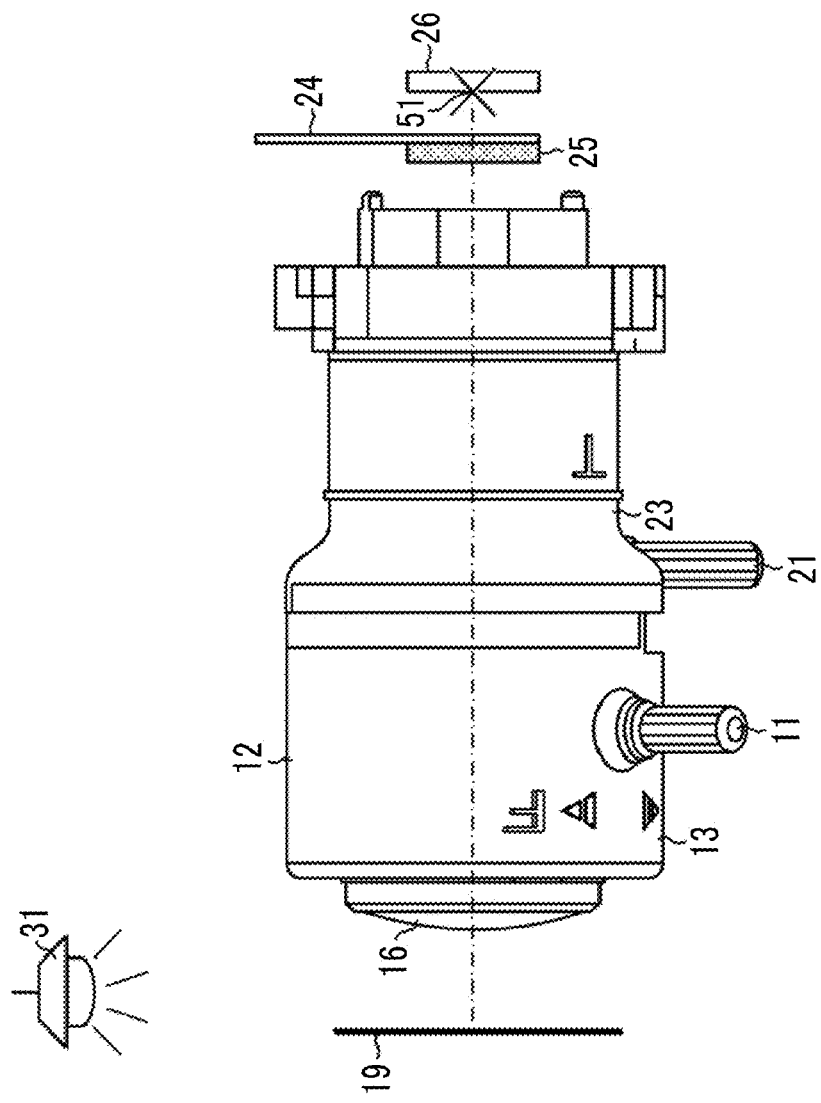
FIGS. 12A and 12B are diagrams for describing the focus and the positional relationship between the image forming surface and the image surface of the imaging element.
Figure 12B:
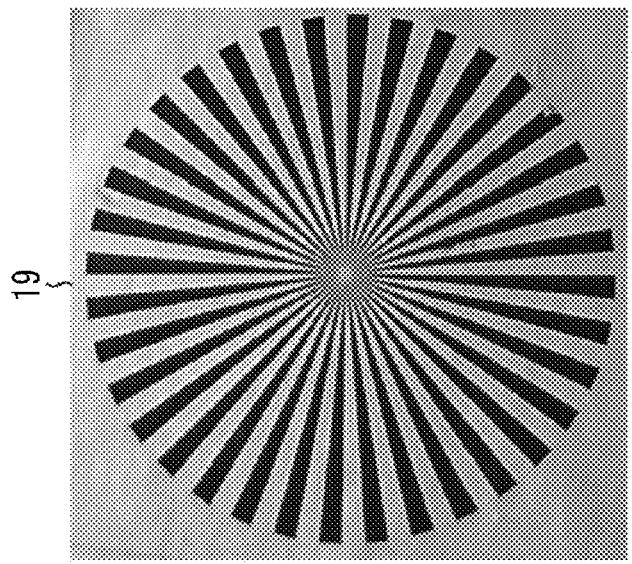

A case where a fluorescent lamp 31 is turned on and the IR cut filter 25 is inserted into the imaging optical path is illustrated in FIGS. 12A and 12B. In this case, a visible light image of the subject 19 is acquired by the imaging element 26. Since the image surface position of the imaging element 26 is set by using a case where the visible light image is acquired as its criterion, an image forming surface 51 of the visible light image of the subject 19 and the image surface position of the imaging element 26 match each other (see FIG. 12A), and an image which is in focus on the subject 19 is acquired (see FIG. 12B).

Figure 13A:
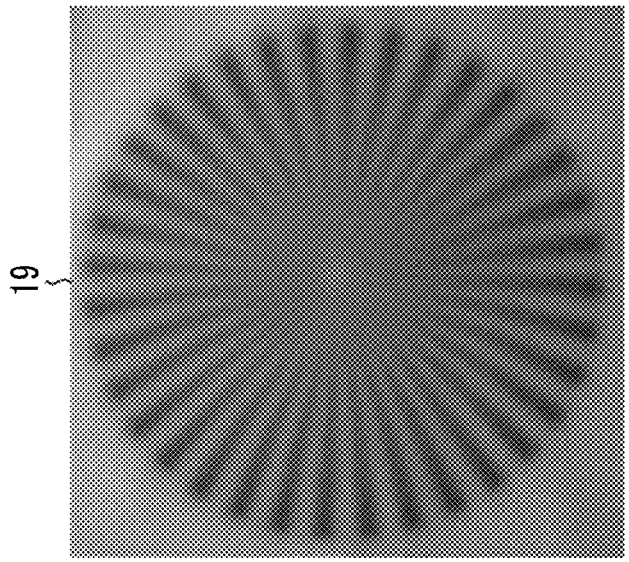
FIGS. 13A and 13B are diagrams for describing the focus and the positional relationship between the image forming surface and the image surface of the imaging element.
Figure 13B:
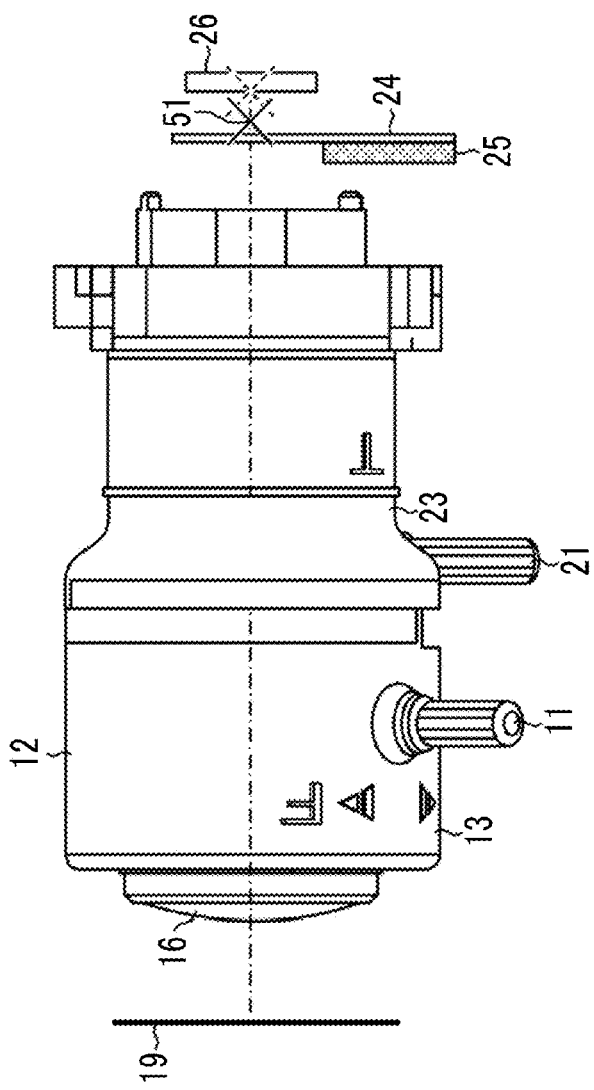

A case where the fluorescent lamp 31 is turned on and the IR cut filter 25 retreats from the imaging optical path is illustrated in FIGS. 13A and 13B. In this case, an image including the visible light image of the subject 19 is acquired by the imaging element 26. Although the image surface position of the imaging element 26 is set by using a case where the visible light image is acquired as its criterion, since the IR cut filter 25 retreats from the imaging optical path and an optical path length of the visible light image is changed, the image forming surface 51 of the visible light image of the subject 19 and the image surface position of the imaging element 26 do not match each other (see FIG. 13A). Accordingly, a blurred image which is out of focus on the subject 19 is acquired (see FIG. 13B). In this case, the IR cut filter 25 retreats from the imaging optical path and a dummy filter (transparent glass) 27 that adjusts the optical path length is not inserted. In FIG. 13A, the image forming surface of the visible light image in a case where the IR cut filter 25 is inserted into the imaging optical path is represented by a dotted line.

A case where the fluorescent lamp 31 is turned off, an infrared (IR) floodlight 33 that emits the near-infrared ray is turned on, and the IR cut filter 25 retreats from the imaging optical path is illustrated in FIGS. 14A and 14B. In this case, an image including a near-infrared ray image of the subject 19 is acquired by the imaging element 26. An image forming surface 53 of the near-infrared ray image of the subject 19 is closer to the imaging element 26 than the image forming surface 51 of the visible light image. Accordingly, the focus is less shifted than in the case shown in FIGS. 13A and 13B, and thus, it is possible to acquire an image in which the blurring is suppressed (see FIG. 14B). The image forming surface of the visible light image is represented by a dotted line in FIG. 14A.

Figure 15B:
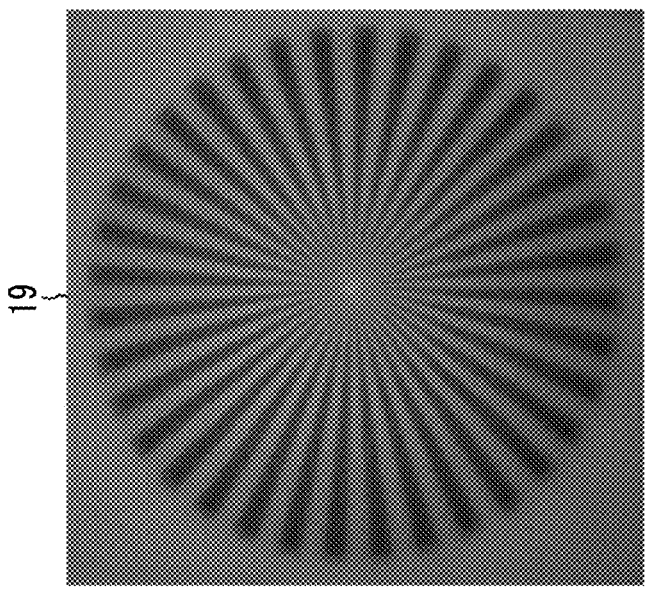
FIGS. 15A and 15B are diagrams for describing the focus and the positional relationship between the image forming surface and the image surface of the imaging element.
Figure 15A:
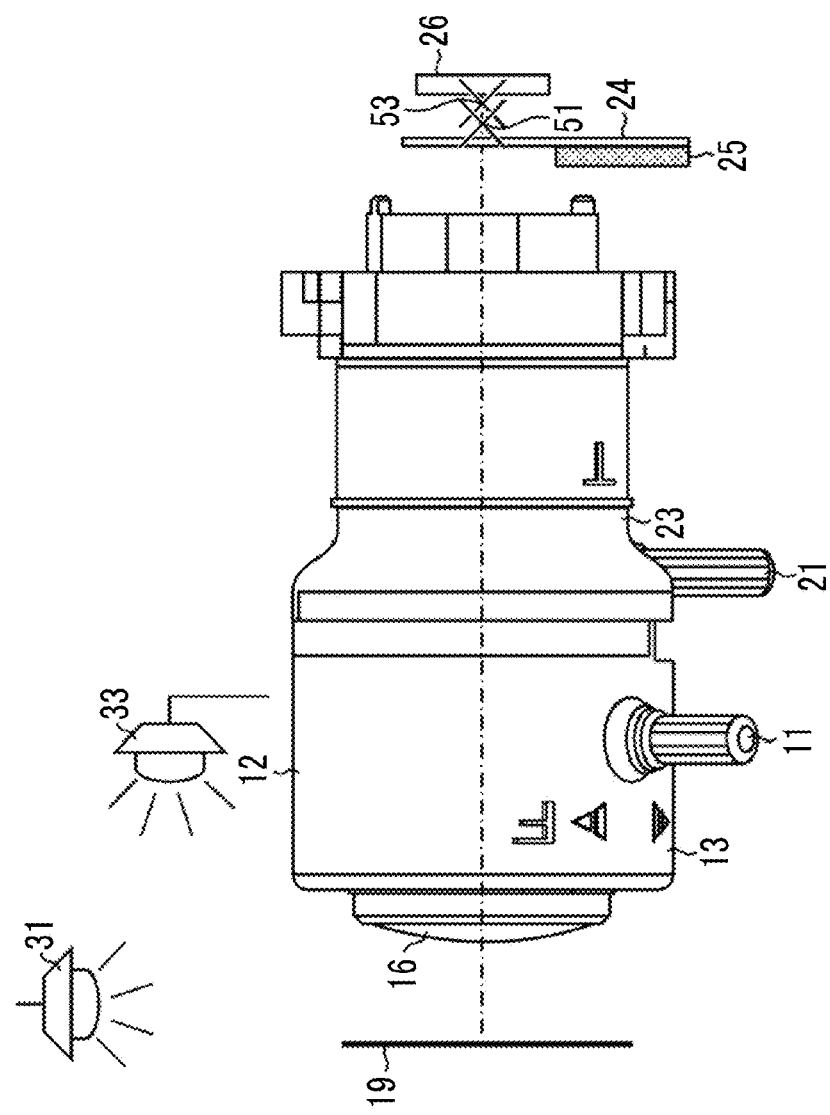

A case where the fluorescent lamp 31 is turned on, the IR floodlight 33 is turned on, and the IR cut filter 25 retreats from the imaging optical path is illustrated in FIGS. 15A and 15B. In this case, an image including the visible light image and the near-infrared ray image of the subject 19 is acquired by the imaging element 26. In this case, since the image forming surface 53 of the near-infrared ray image of the subject 19 and the image forming surface 51 of the visible light image of the subject 19 are present and a difference between the position of the image forming surface 51 of the visible light image and the image surface position of the imaging element 26 is large as described in FIGS. 13A and 13B, an image in which the blurring of the visible light image is remarkable is acquired (see FIG. 15B).

As described above, the image surface position of the imaging element 26 is set by using a case where the visible light image (first image data) of the subject 19 is acquired as its criterion, and thus, it is possible to acquire the near-infrared ray image of the subject 19 in which the blurring is suppressed even in a case where the IR cut filter 25 retreats from the imaging optical path. The image surface position of the imaging element 26 is set by using a case where the visible light image (first image data) of the subject 19 is acquired as its criterion, and thus, it is possible to acquire the image in which the blurring is suppressed in the near-infrared ray image and the visible light image by inserting the dummy filter 27 into the imaging optical path in a case where the IR cut filter 25 retreats from the imaging optical path.

Second Embodiment

Hereinafter, a second embodiment will be described.

Figure 16:
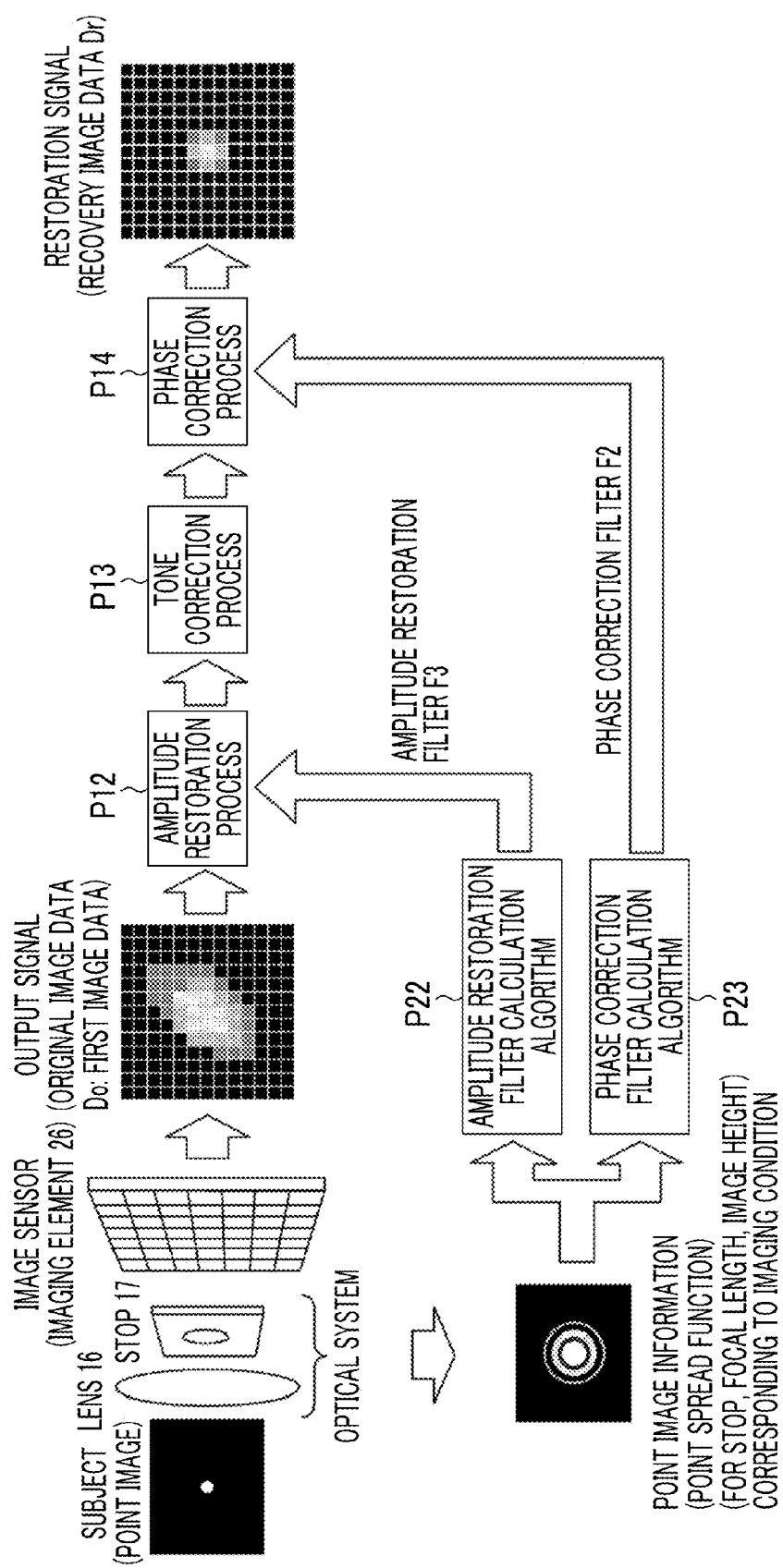
FIG. 16 is a diagram showing an outline of a first restoration process according to a second embodiment.

FIG. 16 is a diagram showing the outline of the first restoration process in a case where the first image data (the image data using the near-infrared ray as the light source) is acquired as the original image data Do according to the second embodiment. The components previously described in FIG. 5 will be assigned the same reference numerals, and the description thereof will be omitted.

In FIG. 16, the first restoration process described in FIG. 5 is separately performed as an amplitude restoration process P12 and a phase correction process P14. A non-linear tone correction process P13 is performed on the first image data on which the amplitude restoration process is performed.

In a case where the first restoration processing unit 3 separately performs the phase correction and the amplitude restoration, the frequency characteristics of the filter are calculated by using the MTF indicating the amplitude component of the OTF instead of the OTF of [Expression 1] described above, and the coefficient values are selected such that the calculated frequency characteristics of the filter are closest to the desired Wiener frequency characteristics. Thus, amplitude restoration filters F3 for recovering the deterioration in the frequency characteristics are calculated. Similarly, the frequency characteristics of the filter are calculated by using the PTF indicating the phase component of the OTF instead of the OTF of [Expression 1] described above, and the coefficient values are selected such that the calculated frequency characteristics of the filter are closest to the desired Wiener frequency characteristics. Thus, phase correction filters F2 for recovering the deterioration in the phase characteristics are calculated. In this case, the amplitude restoration filters F3 and the phase correction filters F2 serve as the first restoration filters.

In order to restore the original subject image (point image) from the original image data Do (first image data) of the blurred image, the amplitude restoration process P12 using the amplitude restoration filters F3 is performed on the original image data Do. Thus, the amplitude of the point-asymmetric blurred image is restored, and the blurred image becomes small.

Subsequently, the non-linear tone correction process P13 (gamma-correction processing through a logarithm process) is performed on the first image data acquired after the amplitude restoration process. The tone (gamma) correction process is a process of non-linearly correcting the image data such that the image is naturally reproduced by a display device.

The phase correction process P14 using the phase correction filters F2 is performed on the first image data on which the tone correction process is performed. The point-asymmetric image moves depending on the frequency and is recovered to the point-symmetric image through the phase correction process P14. Accordingly, recovery image data Dr indicating an image (recovery image) closer to the original subject image (point image) is acquired.

The amplitude restoration filters F3 used in the amplitude restoration process P12 are acquired by a predetermined amplitude restoration filter calculation algorithm P22 from the point image information (PSF, OTF, or MTF) of the optical system corresponding to the imaging condition in a case where the original image data Do is acquired, and the phase correction filters F2 used in the phase correction process P14 are acquired by a predetermined phase correction filter calculation algorithm P23 from the point image information (PSF, OTF, or PTF) of the optical system corresponding to the imaging condition in a case where the original image data Do is acquired.

The amplitude restoration filters F3 or the phase correction filters F2 in the real space constituted by the N×M taps may be derived by performing Fourier inversion transform on frequency amplitude characteristics of a recovery filter or phase characteristics of the recovery filter in a frequency space. Accordingly, the amplitude restoration filters F3 or the phase correction filters F2 in the real space may be appropriately calculated by determining the amplitude restoration filters or the phase correction filters in the frequency space as the basis and specifying the number of taps constituting the amplitude restoration filters F3 or the phase correction filters F2 in the real space. Preferably, the number of N×M taps of the phase correction filters F2 is greater than the number of taps of the amplitude restoration filters F3 in order to accurately perform the phase correction.

As stated above, in the present embodiment, the non-linear tone correction process P13 is performed on the first image data on which the amplitude restoration process P12 is performed, and the phase correction process P14 is performed on the first image data on which the non-linear tone correction process P13 is performed. Accordingly, in the present embodiment, the phase correction filters greatly spread spatially, and thus, a phenomenon in which an artifact (ringing) is caused around a saturated pixel easily occurs in the phase correction process. However, it is possible to prevent the artifact from being amplified due to the tone correction (the artifact from being greatly caused) by performing the phase correction after the tone correction. Similarly, in the present embodiment, a phenomenon in which color gradation is changed due to the phase correction may occur but it is possible to alleviate the phenomenon. Accurately, the phenomenon in which the color gradation is changed also occurs even though the phase correction is performed after the tone correction, but it is possible to further reduce the number of times of the phenomenon occurrence than in a case where the phase correction is performed before the tone correction. In the present embodiment, since the number of bits of the image data acquired after the tone correction is less than that of the image data acquired before the tone correction, it is possible to reduce the calculation cost in a case where the phase correction using the phase correction filters of which the number of taps is relatively great is performed.

In the present embodiment, the order in which the amplitude restoration process P12 and the phase correction process P14 are performed may be changed. That is, the non-linear tone correction process P13 may be performed on the first image data on which the phase correction process P14 is performed, and the amplitude restoration process P12 may be performed on the first image data on which the non-linear tone correction process P13 is performed. Accordingly, in the present embodiment, since the phase correction is performed before the tone correction (before the frequency characteristics of the image are changed), it is possible to effectively perform the phase correction. Further, since the amplitude restoration is performed after the tone correction, overshoot and/or undershoot slightly occurring due to the amplitude restoration is not amplified (emphasized) due to the tone correction, and, thus, it is possible to prevent the artifact from being greatly caused.

Figure 17:
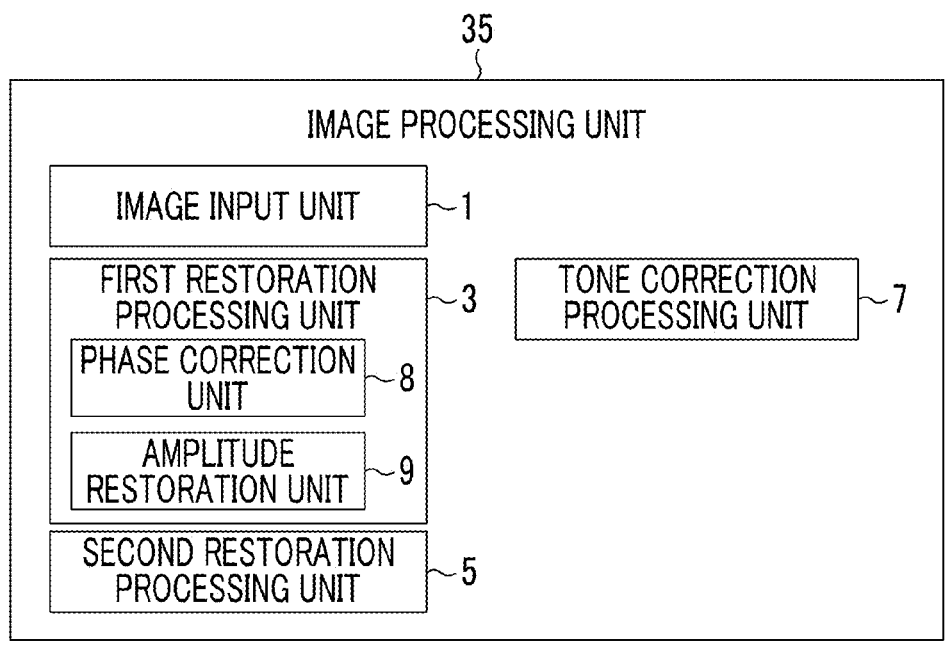
FIG. 17 is a block diagram showing a functional configuration example of an image processing unit according to the second embodiment.

FIG. 17 is a block diagram showing a functional configuration example of the image processing unit 35 according to the second embodiment. The image processing unit 35 of the second embodiment includes the image input unit 1, the first restoration processing unit 3, the second restoration processing unit 5, and the tone correction processing unit 7. The components described in FIG. 7 will be assigned the same reference numerals, and the description thereof will be omitted.

The first restoration processing unit 3 includes a phase correction unit 8 and an amplitude restoration unit 9. The phase correction unit 8 performs the phase correction on the first image data, and the amplitude restoration unit 9 performs the amplitude restoration on the first image data.

The tone correction processing unit 7 is a part that performs the non-linear tone correction on the image data. For example, the tone correction processing unit performs the gamma-correction processing on the input image data through the logarithm process, and performs a non-linear process on the image data such that the image is naturally reproduced by the display device.

Figure 18:
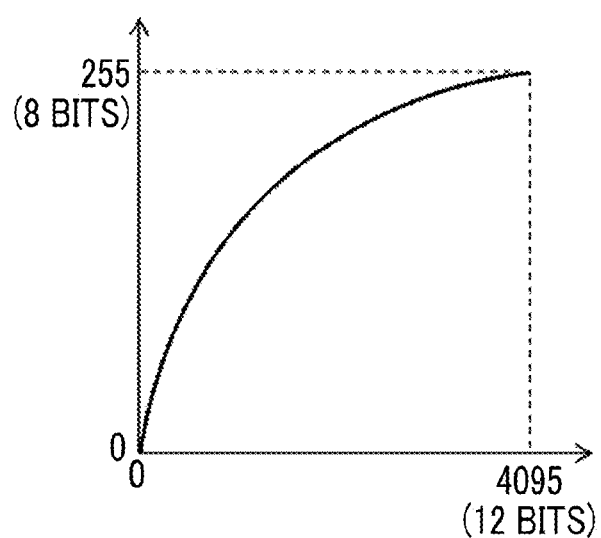
FIG. 18 is a graph showing an example of input and output characteristics (gamma characteristics) that a tone is corrected by a tone correction processing unit.

FIG. 18 is a graph showing an example of input and output characteristics (gamma characteristics) of the image data of which the tone is corrected by the tone correction processing unit 7. In the present example, the tone correction processing unit 7 performs the gamma correction corresponding to the gamma characteristics on the image data items of 12 bits (0 to 4,095), and generates color data items (1-byte data items) of 8-bit (0 to 255) image data items. The tone correction processing unit 7 also performs a non-linear tone correction along a tone curve on the input data.

Specific Example 1

Figure 19:
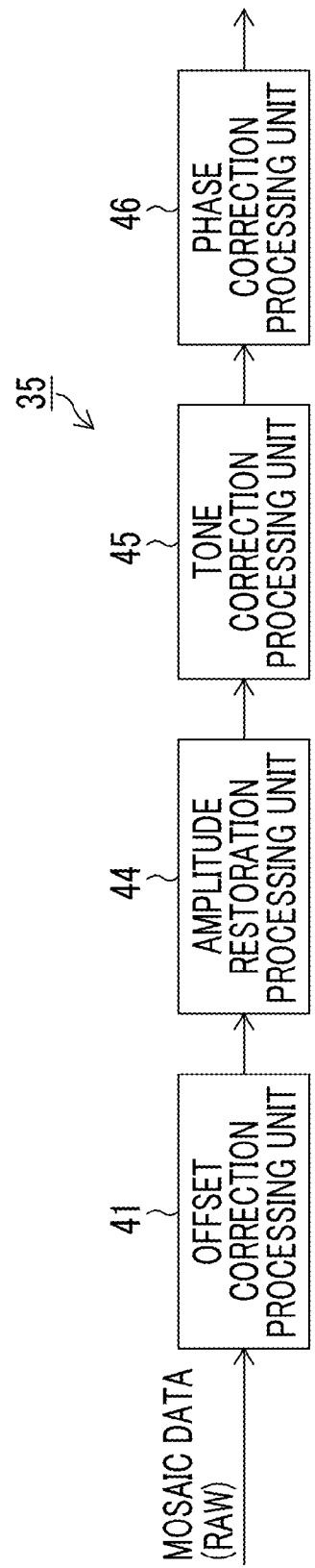
FIG. 19 is a block diagram showing an example of a specific process of an image processing unit according to the second embodiment.

FIG. 19 is a block diagram showing an example (Specific Example 1) of a specific process of the image processing unit 35 according to the second embodiment.

The image processing unit 35 of the present example includes an offset correction processing unit 41, an amplitude restoration processing unit 44, a tone correction processing unit 45 including a gamma correction processing unit, and a phase correction processing unit 46. The amplitude restoration process P12 described in FIG. 16 is performed in the amplitude restoration processing unit 44, and the phase correction process P14 described in FIG. 16 is performed in the phase correction processing unit 46.

In FIG. 19, mosaic data items (RAW data items) which are acquired before the image processing and are acquired from the imaging element 26, are dot-sequentially input to the offset correction processing unit 41. For example, the mosaic data items are data items (2-byte data per pixel) having a bit length of 12 bits (0 to 4,095).

The offset correction processing unit 41 is a processing unit that corrects dark current components included in the input mosaic data items, and performs offset correction of the mosaic data items by subtracting signal values of optical black (OB) acquired from light-shielding pixels on the imaging element 26 from the mosaic data items.

The mosaic data items on which the offset correction is performed are applied to the amplitude restoration processing unit 44, and the amplitude restoration process is performed.

The image data on which the amplitude restoration process is performed by the amplitude restoration processing unit 44 are applied to the tone correction processing unit 45.

The tone correction processing unit 45 is a part that performs the non-linear tone correction on the image data on which the amplitude restoration process is performed. For example, the tone correction processing unit performs the gamma-correction processing on the input image data through the logarithm process, and performs the non-linear process on the image data such that the image is naturally reproduced by the display device.

Image data on which the tone correction is performed by the tone correction processing unit 45 are applied to the phase correction processing unit 46, and the phase correction process of the image data is performed.

Specific Example 2

Figure 20:
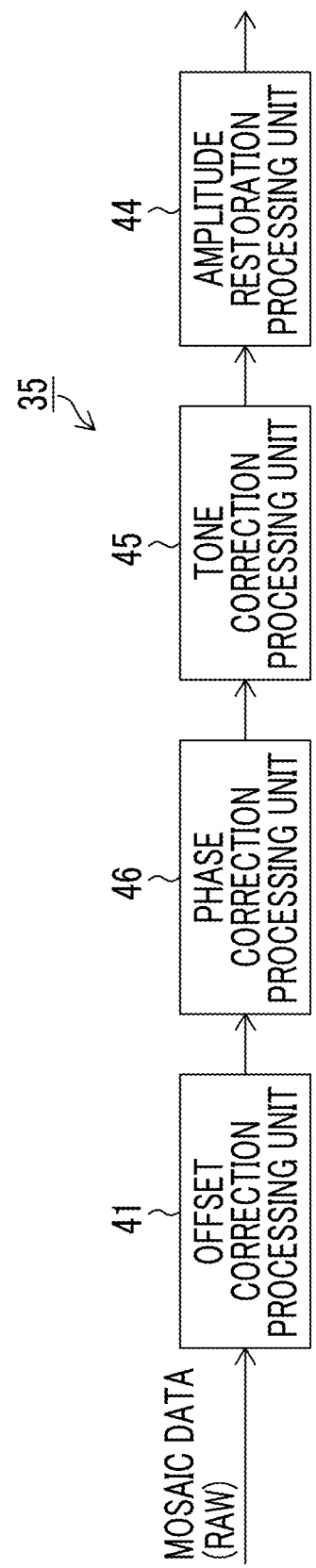
FIG. 20 is a block diagram showing an example of a specific process of the image processing unit according to the second embodiment.

FIG. 20 is a block diagram showing an example (Specific Example 2) of a specific process of the image processing unit 35 according to the second embodiment. In FIG. 20, the components in common with the specific example of the image processing unit 35 shown in FIG. 19 will be assigned the same reference numerals, and the detailed description thereof will be omitted.

The image processing unit 35 of the present example includes the offset correction processing unit 41, the phase correction processing unit 46, the tone correction processing unit 45 including the gamma correction processing unit, the amplitude restoration processing unit 44.

The image processing unit 35 of the present example is different from Specific Example 1 in that the order in which the amplitude restoration processing unit 44 and the phase correction processing unit 46 are provided is reversed. That is, in the present example, the image data on which the offset correction process is performed is applied to the phase correction processing unit 46, and the phase correction is performed. In the present example, the image data on which the tone correction process is performed in the tone correction processing unit 45 is applied to the amplitude restoration processing unit 44, and the amplitude restoration process is performed.

Third Embodiment

Hereinafter, a third embodiment will be described.

Figure 21:
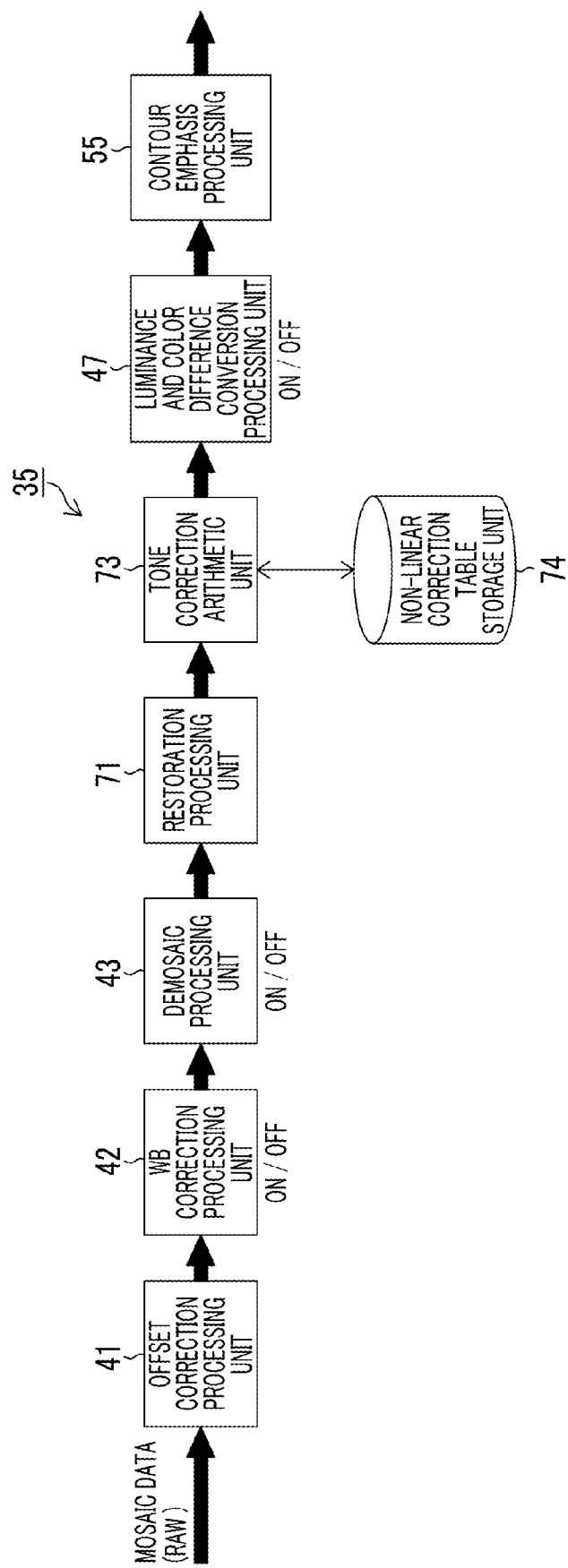
FIG. 21 is a block diagram showing an example of a specific process of an image processing unit according to a third embodiment.

FIG. 21 is a block diagram showing an example of a specific process of the image processing unit 35 according to the third embodiment. In the image processing unit 35 according to the third embodiment, a common image processing circuit processes the image data of the image using the visible light as the light source, the image data (first image data) of the image using the near-infrared ray as the light source, and the image data (second image data) of the image using the near-infrared ray and the visible light as the light source. The RGB data is acquired in a case where the imaging is performed in the visible light imaging mode of the digital camera 10 (FIG. 1), and the IR data is acquired in a case where the imaging is performed in the near-infrared ray imaging mode (FIG. 2). Since the first image data and the second image data are acquired in the near-infrared ray imaging mode, these image data items are IR data items.

The image processing unit 35 of the present example includes the offset correction processing unit 41, the WB correction processing unit 42 that adjusts the white balance (WB), the demosaic processing unit 43, a restoration processing unit 71, a tone correction arithmetic unit 73, a non-linear correction table storage unit 74, the luminance and color difference conversion processing unit 47, and a contour emphasis processing unit 55.

The mosaic data items (RAW data items) which are acquired before the image processing and are acquired from the imaging element 26 are dot-sequentially input to the offset correction processing unit 41 in a case where the imaging is performed in the visible light imaging mode and the near-infrared ray imaging mode.

The offset correction processing unit 41 is a processing unit that corrects dark current components included in the input mosaic data items, and performs offset correction of the mosaic data items by subtracting signal values of optical black (OB) acquired from light-shielding pixels on the imaging element 26 from the mosaic data items.

The mosaic data items on which the offset correction is performed are applied to the WB correction processing unit 42. In a case where the image data (RGB data items) imaged in the visible light imaging mode is input, the WB correction processing unit 42 multiplies the RGB data items by the WB gains set for the RGB colors, and performs the white balance correction of the RGB data items. For example, it is assumed that the type of the light source is automatically determined based on the RGB data items or the type of the light source is manually selected, the WB gain appropriate for the determined or selected type of the light source is set. The method of setting the WB gain is not limited thereto, and the WB gain may be set by another known method. In a case where the image data (IR data) (the first image data or the second image data) imaged in the near-infrared ray imaging mode is input, since it is not necessary to perform the WB correction, the WB correction processing unit 42 outputs the image data without performing the process in a case where the IR data is input. In a case where the IR data is input, the WB correction processing unit 42 may perform a process of adjusting an output value from a pixel having an R filter, an output value from a pixel having a G filter, and an output value from a pixel having a B filter.

In a case where the image data (RGB data items) imaged in the visible light imaging mode is input, the demosaic processing unit 43 calculates all color information items of RGB for the pixels from the mosaic image including RGB. That is, the demosaic processing unit 43 generates image data having three RGB surfaces synchronized from the mosaic data items (dot-sequentially input RGB data items). In a case where the image data (IR data) imaged in the near-infrared ray imaging mode is input, since the demosaic processing unit 43 does not need to perform the demosaic process, the demosaic processing unit 43 outputs the image data without performing the process. It is considered that it is not necessary to perform the demosaic process on the IR data since output sensitivity from the pixel having the R filter, output sensitivity from the pixel having the G filter, and output sensitivity from the pixel having the B filter are substantially equal to each other.

The RGB data items and the IR data output from the demosaic processing unit 43 are input to the restoration processing unit 71, and the visible light restoration process, the first restoration process, and the second restoration process are performed.

Figure 22:
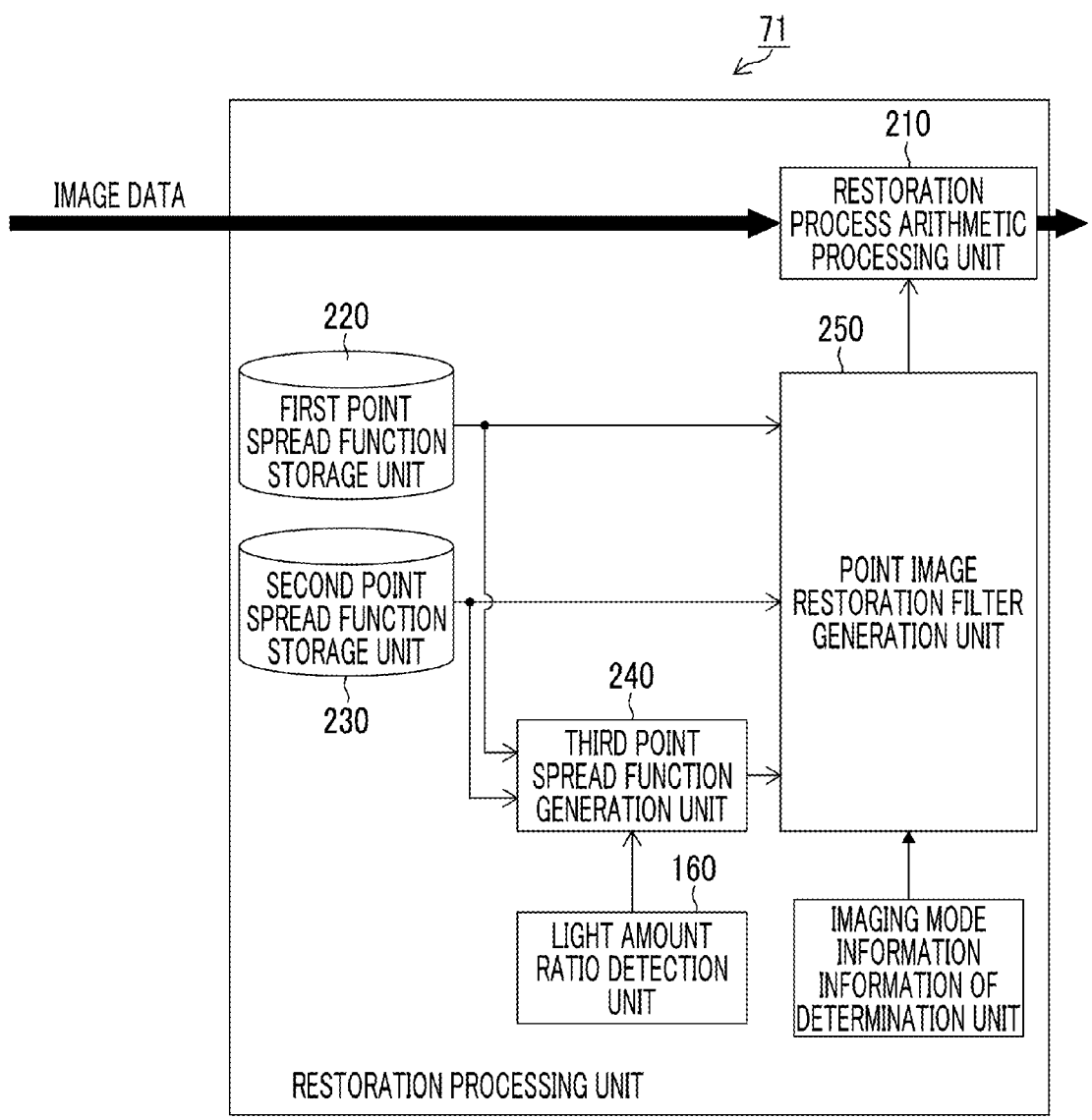
FIG. 22 is a block diagram showing a functional configuration example of a restoration processing unit according to the third embodiment.

FIG. 22 is a block diagram showing the restoration processing unit 71. The restoration processing unit 71 mainly includes a restoration process arithmetic unit 210, a first point spread function storage unit 220, a second point spread function storage unit 230, a third point spread function generation unit 240, a point image restoration filter generation unit (filter generation unit) 250, and a light amount ratio detection unit 160.

The RGB data items are input to the restoration process arithmetic unit 210 in a case where the imaging is performed in the visible light imaging mode, and the IR data is input to the restoration process arithmetic unit 210 in a case where the imaging is performed in the near-infrared ray imaging mode. The restoration process arithmetic unit 210 performs the point image restoration process using the restoration filters generated by the point image restoration filter generation unit 250 on the input image data (RGB data items and IR data), and calculates the image data on which the point image restoration process is performed.

The first point spread function storage unit 220 is a storage unit that stores the first point spread function (first PSF) for the visible light of the optical system (lens 16).

The second point spread function storage unit 230 is a storage unit that stores the second point spread function (second PSF) for the near-infrared ray of the optical system (lens 16).

Since the point image is imaged under lighting conditions in which the light source using only the visible light is used and the light source using only the near-infrared ray and the first PSF and the second PSF are measured based on the image data items of the point images acquired in which the imaging is performed under the lighting conditions, the first PSF and the second PSF are previously measured before product shipment, and are stored in the first point spread function storage unit 220 and the second point spread function storage unit 230. The first point spread function storage unit 220 and the second point spread function storage unit 230 are not limited to storing the PSF. That is, the OTF, PTF, and MTF may be stored in the first point spread function storage unit 220 and the second point spread function storage unit 230.

The third point spread function generation unit 240 is a part that generates a point spread function for the twilight. For example, based on a first MTF read out from the first point spread function storage unit 220, a second MTF read out from the second point spread function storage unit 230, and a light amount ratio applied from the light amount ratio detection unit 160, the third point spread function generation unit 240 calculates a third MTF acquired by performing weighted averaging of the first MTF and the second MTF depending on the light amount ratio.

In this example, the light amount ratio between the light amount of the visible light and the light amount of the near-infrared ray in the twilight is expressed as p:q and p+q=1, the third point spread function generation unit 240 calculates the third MTF for the twilight by using the following expression.

$$\text{third PSF} = \text{first PSF} \times p + \text{second PSF} \times q \qquad \text{[Expression 2]}$$

The point image restoration filter generation unit 250 acquires functions such as the MTF and PSF corresponding to the image data from the first point spread function storage unit 220, the second point spread function storage unit 230, or the third point spread function generation unit 240, and generates the restoration filters based on the acquired functions.

The imaging mode information and the information of the determination unit 2 are input to the point image restoration filter generation unit 250 from the camera main body controller 28. In a case where the image data using the visible light as the light source is input to the restoration processing unit 71, the point image restoration filter generation unit 250 reads out the first PSF from the first point spread function storage unit 220 based on these input information items, and generates the restoration filters based on the read first PSF.

Similarly, in a case where the image data (first image data) using the near-infrared ray as the light source is input to the restoration processing unit 71, the point image restoration filter generation unit 250 reads out the second PSF from the second point spread function storage unit 230, and generates the restoration filters based on the read second PSF. Similarly, in a case where the image data (second image data) using the near-infrared ray and the visible light as the light source is input, the point image restoration filter generation unit 250 acquires the MTF generated by the third point spread function generation unit 240, and generates the restoration filters based on the acquired third MTF.

Referring back to FIG. 21, the RGB data items and the IR data on which the point image restoration process is performed by the restoration processing unit 71 are applied to the tone correction arithmetic unit 73.

The tone correction arithmetic unit 73 is a part that performs the non-linear tone correction on the RGB data items and the IR data. For example, the tone correction arithmetic unit 73 performs the gamma-correction processing on the input RGB data items and IR data through the logarithm process, and performs the non-linear process on the RGB data items such that the image is naturally reproduced by the display device. The tone correction arithmetic unit 73 acquires table data for performing the non-linear tone correction from the non-linear correction table storage unit 74 depending on the image data. In this example, table data for performing the non-linear tone correction on the R, G, and B data items and table data for performing the non-linear tone correction on the IR data are stored in the non-linear correction table storage unit 74.

In a case where the image data imaged in the visible light imaging mode is input, the (R) (G) (B) data items on which the tone correction is performed by the tone correction arithmetic unit 73 and the (IR) data on which the tone correction is performed are applied to the luminance and color difference conversion processing unit 47. The RGB data items acquired after the tone correction are described as (R) (G) (B) data items, and the IR data acquired after the tone correction is described as (IR) data.

The luminance and color difference conversion processing unit 47 is a processing unit that converts the (R) (G) (B) data items into the color difference data items (Cr) and (Cb) and the luminance data (Y) indicating the luminance component, and calculates these data items by the expression represented in [Expression 3] to be represented below. In a case where the image data imaged in the near-infrared ray imaging mode is input, since the luminance and color difference conversion processing unit 47 does not need to convert the (IR) data into the luminance data (Y) and the color difference data items (Cr) and (Cb), the luminance and color difference conversion processing unit 47 outputs the (IR) data without performing the process.

$$(Y)=0.299(R)+0.587(G)+0.114(B)$$

$$(Cb)=-0.168736(R)-0.331264(G)+0.5(B)$$

$$(Cr)=-0.5(R)-0.418688(G)-0.081312(B) \quad [\text{Expression 3}]$$

(R) (G) (B) data items are 8-bit data items acquired after the tone correction and phase correction processes, and the luminance data (Y) and the color difference data items (Cr) and (Cb) converted from these (R) (G) (B) data items are also 8-bit data items. The conversion expression for converting the (R) (G) (B) data items into the luminance data (Y) and the color difference data items (Cr) and (Cb) is not limited to [Expression 3].

The image data output from the luminance and color difference conversion processing unit 47 is input to the contour emphasis processing unit 55.

The contour emphasis processing unit 55 performs a contour emphasis process on the input data items (Y), (Cb), and (Cr) and the (IR) data. The contour emphasis processing unit 55 performs the contour emphasis process on the data (Y) in a case where the data items (Y), (Cb), and (Cr) are input, and performs the contour emphasis process on the (IR) data in a case where the (IR) data is input.

According to the present embodiment, since the common image processing circuit processes the image data imaged in the visible light imaging mode and the image data imaged in the near-infrared ray imaging mode, it is possible to reduce a design load of the circuit, and it is possible to reduce the size of the circuit.

<Application Example to EDoF System>

The point image restoration process (amplitude restoration process and phase correction process) according to the above-described embodiments is the image processing for restoring the original subject image by performing the amplitude restoration process and the phase correction process on the point spread (point image blurring) depending on a specific imaging condition (for example, the stop value, the F-number, the focal length, and the lens type), and the image processing to which the present invention is applicable is not limited to the restoration process according to the above-described embodiments. For example, the restoration process according to the present invention may be applied to the restoration process performed on the image data imaged and acquired by the optical system (imaging lens) having an extended depth of field (focus) (EDoF). The restoration process is performed on the image data of the blurred image imaged and acquired in a state in which the depth of field (focal depth) is extended by the EDoF optical system, and thus, it is possible to restore and generate high-resolution image data which is in focus over a wide range. In this case, the restoration process using the amplitude restoration filters and the phase correction filters which are the amplitude restoration filters and the phase correction filters based on the transfer function (PSF, OTF, MTF, or PTF) of the EDoF optical system and have the filter coefficients set such that favorable image restoration is able to be performed in a range of the extended depth of field (focal depth) is performed.

Figure 23:
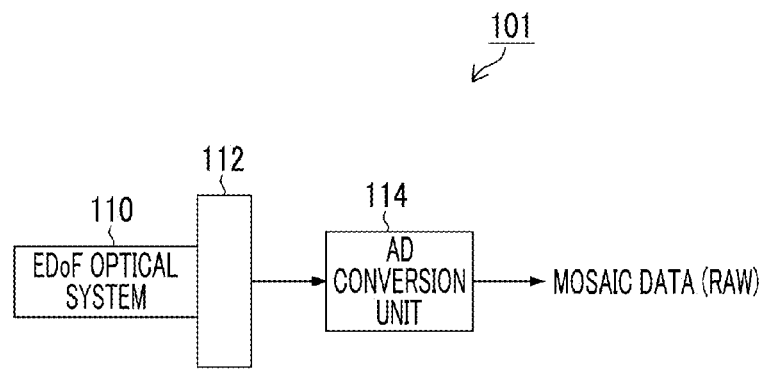
FIG. 23 is a block diagram showing one embodiment of an imaging module including an EDoF optical system.

FIG. 23 is a block diagram showing an embodiment of an imaging module 101 including the EDoF optical system. The imaging module (a camera head mounted on the digital camera) 101 of the present example includes an EDoF optical system (lens unit) 110, an imaging element 112, and an analog-to-digital (AD) conversion unit 114.

Figure 24:
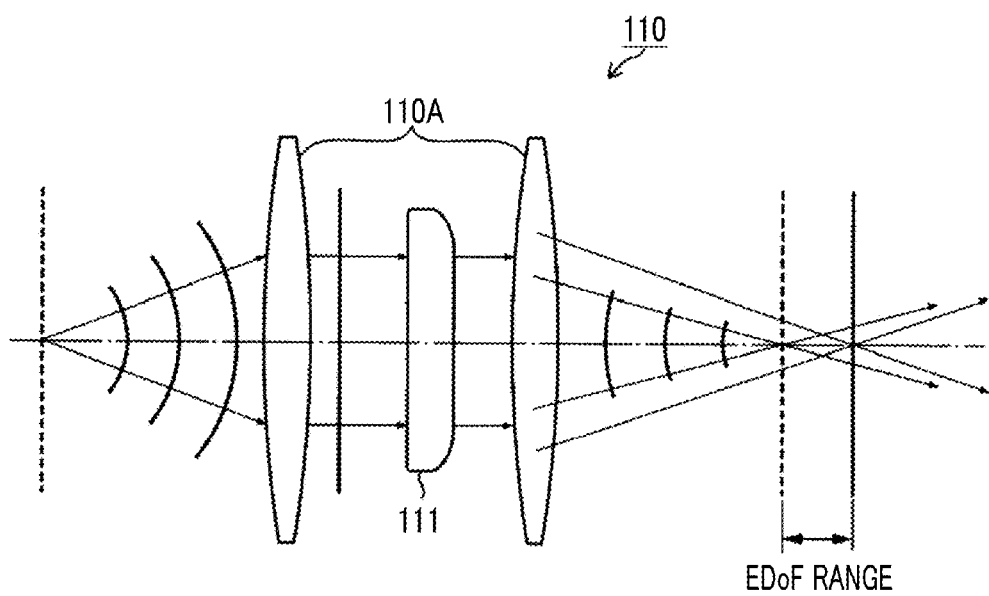
FIG. 24 is a diagram showing an example of the EDoF optical system.

FIG. 24 is a diagram showing an example of the EDoF optical system 110. The EDoF optical system 110 of the present example includes an imaging lens 110A having a fixed unifocal length and an optical filter 111 disposed in a pupil position. The optical filter 111 modulates the phase, and ensures the EDoF of the EDoF optical system 110 (imaging lens 110A) such that the extended depth of field (focal depth) (EDoF) is ensured. As stated above, the imaging lens 110A and the optical filter 111 constitute a lens unit that modulates the phase and extends the depth of field.

The EDoF optical system 110 includes another constituent element when necessary. For example, a stop (not shown) is provided around the optical filter 111. One optical filter 111 may be provided, or a plurality of optical filters may be combined. The optical filter 111 is merely an example of optical phase modulation means, and the EDoF of the EDoF optical system 110 (imaging lens 110A) may be ensured by another means. For example, instead of providing the optical filter 111, the EDoF of the EDoF optical system 110 may be ensured by the imaging lens 110A of which the lens is designed so as to have the same function as that of the optical filter 111 of the present example.

That is, the EDoF of the EDoF optical system 110 may be ensured by various means for changing an image forming wavefront on a light reception surface of the imaging element 112. For example, an "optical element of which a thickness is changed", an "optical element (a refractive index distribution type wavefront modulation lens) of which a refractive index is changed", an "optical element (a wavefront modulation hybrid lens or an optical element formed as a phase surface on the lens surface) of which a thickness or a refractive index is changed through coding on a lens surface", and a "liquid crystal element (a liquid crystal spatial phase modulation element) capable of modulating the phase distribution of light" may be employed as means for ensuring the EDoF of the EDoF optical system 110. As stated above, in addition to a case where images which are regularly distributed by an optical wavefront modulation element (the optical filter 111 (a phase plate)) are able to be formed, the present invention may be applied to a case where the same distributed images as those in a case where the optical wavefront modulation element is used are able to be formed by the imaging lens 110A without using the optical wavefront modulation element.

Since a focus adjustment mechanism that mechanically performs focus adjustment may be omitted in the EDoF optical system 110 shown in FIGS. 23 and 24, it is possible to reduce a size of the EDoF optical system, and it is possible to appropriately mount the EDoF system on a mobile phone or a mobile information terminal with a camera.

An optical image that passes through the EDoF optical system 110 that acquires the EDoF is formed on the imaging element 112 shown in FIG. 23, and is converted into an electrical signal.

The same imaging element as the imaging element 26 shown in FIG. 1 may be employed as the imaging element 112.

The analog-to-digital conversion unit (AD conversion unit) 114 converts analog RGB image signals output to pixels from the imaging element 112 into digital RGB image signals. The digital image signals acquired by converting the analog image signals into the digital image signals by the AD conversion unit 114 are output as the mosaic data items (RAW image data items).

The image processing unit (image processing device) 35 shown in the above-described embodiments is applied to the mosaic data items output from the imaging module 101, and thus, it is possible to generate high-resolution recovery image data which is in focus over a wide range.

Figure 25:
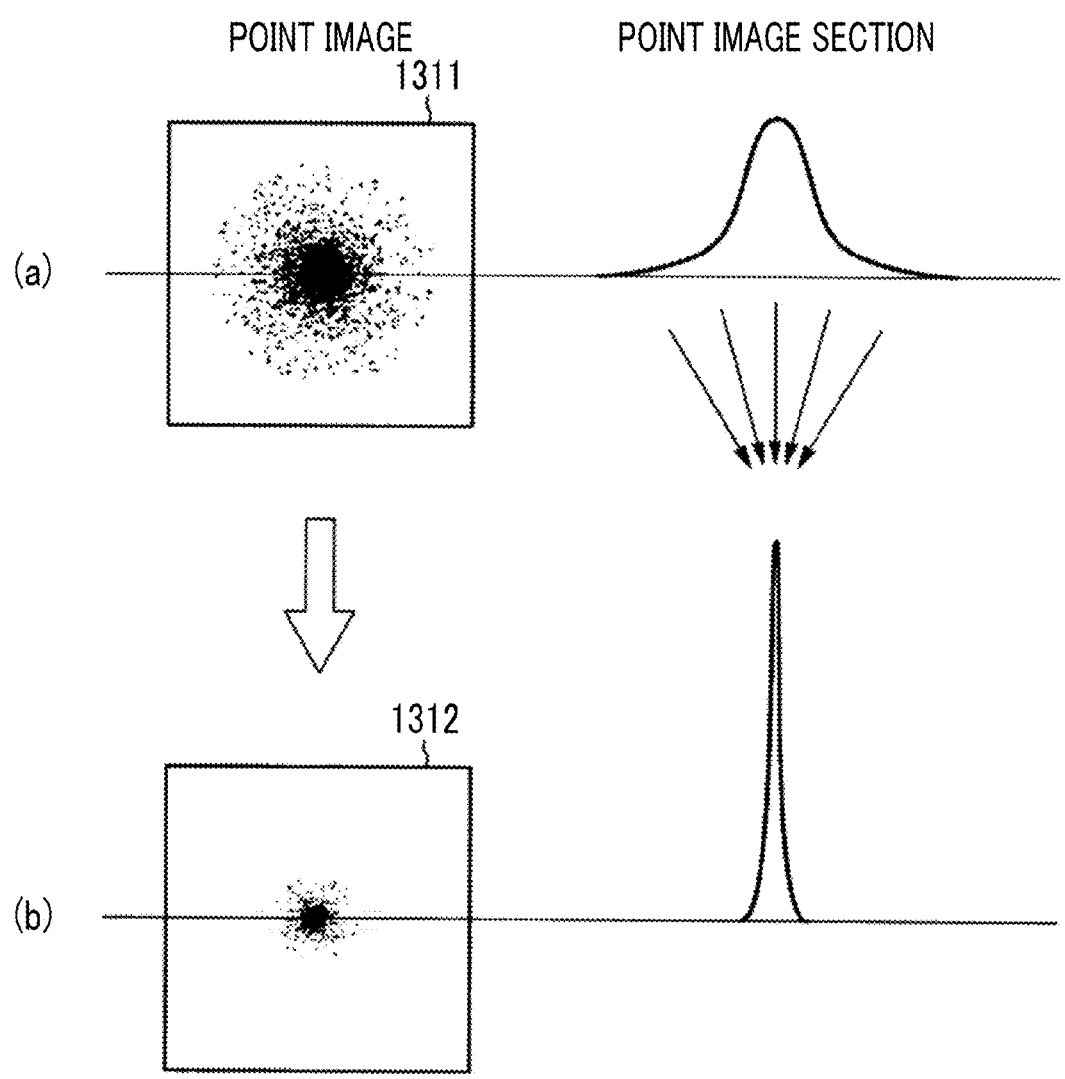
FIG. 25 is a diagram showing a restoration example of an image acquired through the EDoF optical system.

That is, as depicted by reference numeral 1311 of FIG. 25, the point image (optical image) that passes through the EDoF optical system 110 is formed as a large point image (blurred image) on the imaging element 112, but is restored as a small point image (high-resolution image) as depicted by 1312 of FIG. 25 by performing the point image restoration process (amplitude restoration process and phase correction process) by the image processing unit (image processing device) 35.

Although it has been described in the above-described embodiments that the image processing unit (image processing device) 35 is provided in the camera main body 14 (camera main body controller 28) of the digital camera 10, the image processing unit (image processing device) 35 may be provided in another device such as the computer 60 or the server 80.

For example, in a case where the image data is processed in the computer 60, the point image restoration process of this image data may be performed by the image processing unit (image processing device) 35 provided in the computer 60. For example, in a case where the server 80 includes the image processing unit (image processing device) 35, the image data may be transmitted to the server 80 from the digital camera 10 or the computer 60, and the point image restoration process may be performed on this image data in the image processing unit (image processing device) 35 of the server 80. The image data (recovery image data) acquired after the point image restoration process may be transmitted and provided to a transmission source.

While the examples of the present invention have been described above, the present invention is not limited to the above-described embodiments, and may be changed in various forms without departing from the spirit of the present invention.

EXPLANATION OF REFERENCES

1: image input unit
2: determination unit
3: first restoration processing unit
4: light amount detection unit
5: second restoration processing unit
6: visible light restoration processing unit
7: tone correction processing unit
8: phase correction unit
9: amplitude restoration unit
10: digital camera
12: lens unit
14: camera main body
15: near-infrared ray emitting unit
16: lens
17: stop
18: optical system operation unit
19: subject
20: lens unit controller
22: lens-unit input and output unit
24: cut filter operation mechanism
25: IR cut filter
26: imaging element
27: dummy filter
28: camera main body controller
30: camera-main-body input and output unit
31: fluorescent lamp
32: input and output interface
33: IR floodlight
34: device control unit
35: image processing unit
36: light amount acquisition unit
60: computer
62: computer input and output unit
64: computer controller
66: display
70: Internet
80: server
82: server input and output unit
84: server controller
101: imaging module
110: EDoF optical system
110A: imaging lens
111: optical filter
112: imaging element
114: AD conversion unit

What is claimed is:

1. An image processing device comprising:
an image input unit that receives image data imaged with sensitivity to a visible light wavelength band and a near-infrared ray wavelength band by using an optical system;
a determination unit that determines whether the image data is first image data using a near-infrared ray as a light source or second image data using a near-infrared ray and visible light as a light source;

a first restoration processing unit that performs a first restoration process using first restoration filters for performing phase correction and amplitude restoration on the first image data determined by the determination unit, the first restoration filters being based on a first point spread function for a near-infrared ray of the optical system; and a second restoration processing unit that performs a second restoration process using second restoration filters for performing amplitude restoration without phase correction on the second image data determined by the determination unit, the second restoration filters being based on a second point spread function for visible light and a near-infrared ray of the optical system.

2. The image processing device according to claim 1, further comprising a light amount detection unit that detects a light amount of the image data, wherein the determination unit determines whether the image data is the first image data or the second image data based on the light amount detected by the light amount detection unit.

3. The image processing device according to claim 1, wherein the determination unit determines whether the image data is the first image data or the second image data based on a time when the image data is acquired.

4. The image processing device according to claim 1, further comprising a tone correction processing unit that performs non-linear tone correction on the first image data, wherein:

the tone correction processing unit performs the non-linear tone correction on the first image data on which the phase correction is performed; and the first restoration processing unit performs the amplitude restoration on the first image data on which the non-linear tone correction is performed.

5. The image processing device according to claim 1, further comprising a tone correction processing unit that performs non-linear tone correction on the first image data, wherein:

the tone correction processing unit performs the non-linear tone correction on the first image data on which the amplitude restoration is performed; and the first restoration processing unit performs the phase correction on the first image data on which the non-linear tone correction is performed.

6. The image processing device according to claim 1, further comprising at least one of a common restoration process arithmetic unit that is used in a restoration process arithmetic of the first restoration processing unit and the second restoration processing unit, a common tone correction arithmetic unit that performs non-linear tone correction on the first image data and the second image data, or a common contour emphasis processing unit that performs a contour emphasis process on the first image data and the second image data.

7. The image processing device according to claim 1, further comprising a light amount ratio detection unit that detects a light amount ratio between a light amount of the visible light and a light amount of the near-infrared ray in the second image data, wherein the second restoration processing unit uses the second restoration filters generated based on a modulation transfer function of the visible light of the optical system and a modulation transfer function of the near-infrared ray of the optical system depending on the light amount ratio detected by the light amount ratio detection unit.

8. The image processing device according to claim 1, further comprising a storage unit that stores the first restoration filters and the second restoration filters.

9. The image processing device according to claim 1, further comprising a filter generation unit that generates the first restoration filters and the second restoration filters.

10. An imaging device comprising:

an optical system;

a near-infrared ray emitting unit that emits a near-infrared ray as auxiliary light;

an image acquisition unit that acquires image data imaged with sensitivity to a visible light wavelength band and a near-infrared ray wavelength band by using the optical system;

a determination unit that determines whether the image data is first image data using a near-infrared ray as a light source and second image data using a near-infrared ray and visible light as a light source;

a first restoration processing unit that performs a first restoration process using first restoration filters for performing phase correction and amplitude restoration on the acquired first image data, the first restoration filters being based on a first point spread function for a near-infrared ray of the optical system; and a second restoration processing unit that performs a second restoration process using second restoration filters for performing amplitude restoration without phase correction on the acquired second image data, the second restoration filters being based on a second point spread function for visible light and a near-infrared ray of the optical system.

11. The imaging device according to claim 10, wherein an image surface position is set using a case where the image acquisition unit images a visible light image as a criterion.

12. An image processing method comprising:

an image input step of receiving image data imaged with sensitivity to a visible light wavelength band and a near-infrared ray wavelength band by using an optical system;

a determination step of determining whether the image data is first image data using a near-infrared ray as a light source or second image data using a near-infrared ray and visible light as a light source;

a first restoration processing step of performing a first restoration process using first restoration filters for performing phase correction and amplitude restoration on the first image data determined in the determination step, the first restoration filters being based on a first point spread function for a near-infrared ray of the optical system; and a second restoration processing step of performing a second restoration process using second restoration filters for performing amplitude restoration without phase correction on the second image data determined in the determination step, the second restoration filters being based on a second point spread function for visible light and a near-infrared ray of the optical system.

13. A non-transitory computer-readable tangible medium containing a program causing a computer to perform:

an image input step of receiving image data imaged with sensitivity to a visible light wavelength band and a near-infrared ray wavelength band by using an optical system;

a determination step of determining whether the image data is first image data using a near-infrared ray as a light source or second image data using a near-infrared ray and visible light as a light source;

a first restoration processing step of performing a first restoration process using first restoration filters for performing phase correction and amplitude restoration on the first image data determined in the determination step, the first restoration filters being based on a first point spread function for a near-infrared ray of the optical system; and a second restoration processing step of performing a second restoration process using second restoration filters for performing amplitude restoration without phase correction on the second image data determined in the determination step, the second restoration filters being based on a second point spread function for visible light and a near-infrared ray of the optical system.

* * * * *